United States Patent
Gao et al.

(10) Patent No.: US 10,849,155 B2
(45) Date of Patent: Nov. 24, 2020

(54) METHOD AND APPARATUS FOR TRANSMITTING UPLINK CONTROL INFORMATION

(71) Applicant: China Academy of Telecommunications Technology, Beijing (CN)

(72) Inventors: Xuejuan Gao, Beijing (CN); Qianqian Si, Beijing (CN); Xueming Pan, Beijing (CN); Fang-Chen Cheng, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 6 days.

(21) Appl. No.: 16/075,113

(22) PCT Filed: Jan. 18, 2017

(86) PCT No.: PCT/CN2017/071503
§ 371 (c)(1),
(2) Date: Aug. 2, 2018

(87) PCT Pub. No.: WO2017/133451
PCT Pub. Date: Aug. 10, 2017

(65) Prior Publication Data
US 2019/0045536 A1    Feb. 7, 2019

(30) Foreign Application Priority Data

Feb. 2, 2016  (CN) .......................... 2016 1 0074278

(51) Int. Cl.
*H04W 72/14* (2009.01)
*H04W 72/04* (2009.01)
(Continued)

(52) U.S. Cl.
CPC .......... *H04W 72/14* (2013.01); *H04B 7/0626* (2013.01); *H04L 5/0048* (2013.01);
(Continued)

(58) Field of Classification Search
CPC ............. H04W 72/14; H04W 72/0406; H04W 72/0446; H04L 5/0048; H04L 5/0053; H04L 5/0055
See application file for complete search history.

(56) References Cited

U.S. PATENT DOCUMENTS

2012/0127938 A1* 5/2012 Lv ......................... H04W 74/04
2012/0327896 A1* 12/2012 Lee ....................... H04W 72/04
(Continued)

FOREIGN PATENT DOCUMENTS

CN    101997659 A    3/2011
CN    102223720 A    10/2011
(Continued)

OTHER PUBLICATIONS

Huawei et al: "Control signaling enhancements for short TTI", 3GPP Draft; R1-156461, 3rd Generation Partnership Project (3GPP), Mobile Competence Centre ; 650, Route Des Lucioles ; F-06921 Sophia-Antipolis Cedex ; France , RAN WG1, Anaheim, USA; Nov. 15, 2015-Nov. 22, 2015 Nov. 15, 2015 (Nov. 15, 2015), XP051002921.
(Continued)

*Primary Examiner* — Ronald B Abelson
(74) *Attorney, Agent, or Firm* — Foley & Lardner LLP

(57) ABSTRACT

The present invention relates to the field of communications, and in particular, to a method and an apparatus for transmitting uplink control information. The method comprises: a terminal determines a resource for transmitting uplink control information, wherein the resource comprises a time domain occupation resource and a frequency domain occupation resource, and duration of the time domain occupation
(Continued)

resource is less than 1 ms; and then the terminal transmits the uplink control information on the determined resource. In this way, a solution for uplink control information transmission is provided for the shortened TTI, normal feedback of the uplink control information is supported, and the system performance is ensured.

18 Claims, 12 Drawing Sheets

(51) Int. Cl.
 *H04L 5/00* (2006.01)
 *H04B 7/06* (2006.01)
(52) U.S. Cl.
 CPC .......... *H04L 5/0053* (2013.01); *H04L 5/0055* (2013.01); *H04W 72/0406* (2013.01); *H04W 72/0446* (2013.01); *H04L 5/0007* (2013.01); *H04W 72/0413* (2013.01)

(56) References Cited

U.S. PATENT DOCUMENTS

| | | | |
|---|---|---|---|
| 2013/0039284 A1* | 2/2013 | Marinier | H04W 72/02 |
| 2013/0163540 A1 | 6/2013 | Roh et al. | |
| 2014/0044090 A1* | 2/2014 | Beale | H04W 72/04 |
| 2014/0328260 A1* | 11/2014 | Papasakellariou | H04W 72/12 |

FOREIGN PATENT DOCUMENTS

| | | |
|---|---|---|
| CN | 102438319 A | 5/2012 |
| CN | 104509191 A | 4/2015 |
| CN | 105099634 A | 11/2015 |
| KR | 10-2013-0109158 A | 10/2013 |
| KR | 10-2014-0052020 A | 5/2014 |
| KR | 10-2014-0084140 A | 7/2014 |
| KR | 10-2015-0013443 A | 2/2015 |
| WO | WO-2014/049918 A1 | 4/2014 |
| WO | WO-2015/157565 A1 | 10/2015 |
| WO | WO 2015172363 A1 | 11/2015 |

OTHER PUBLICATIONS

Huawei et al: "Views on TTI length", 1-22, 3GPP Draft; Ri-156459, 3rd Generation Partnership Project (3GPP), Mobile Competence Centre; 650, Route Des Lucioles; F-06921 Sophia-Antipolis Cedex; France v' ol . RAN WGI, No. Anaheim, USA; Nov. 15, 2015-Nov. 22, 2015, Nov. 15, 2015 (Nov. 15, 2015), XP051002919.
ZTE: "L 1 considerations on latency reduction", 3GPP Draft; R1-157151 L1 Considerations on Latency Reduction, 3rd Generation Partnership Project (3GPP), Mobile Competence Centre ; 650, Route Des Lucioles ; F-06921 Sophia-Antipolis Cedex ; France, RAN WG1 , Anaheim, USA; Nov. 15, 2015-Nov. 22, 2015 Nov. 7, 2015 (Nov. 7, 2015), XP051022679.
$3^{rd}$ Generation Partnership Project; Technical Specification Group Radio Access Network; Evolved Universal Terrestrial Radio Access (E-ULTRA); Study on Latency reduction techniques for LTE (Release 13) (3GPP TR 36.881 V0.4.0 (Oct. 2015).

\* cited by examiner

METHOD AND APPARATUS FOR TRANSMITTING UPLINK CONTROL INFORMATION

This application is a National Stage of International Application No. PCT/CN2017/071503, filed Jan. 18, 2017, which claims priority to Chinese Patent Application No. 201610074278.2, filed Feb. 2, 2016, both of which are hereby incorporated by reference in their entireties.

FIELD

The present invention relates to the field of communications, and particularly to a method and apparatus for transmitting uplink control information.

BACKGROUND

As there are developing and varying demands for mobile communication services, future mobile communication systems are defined with required performance of a shorter user plane delay in the international organizations. Where a user plane delay is generally shortened by reducing a length of a Transmission Time Interval (TTI).

Referring to FIG. 1, there are different carrier frequencies for uplink and downlink transmission, and there is the same frame structure for both uplink and downlink transmission, in a frame structure for an existing Long Term Evolution (LTE) Frequency Division Duplex (FDD) system. Where a radio frame with a length of 10 ms on each carrier includes ten 1 ms sub-frames and each sub-frame is subdivided into two timeslots with a length of 0.5 ms; and a length of time for a TTI in which uplink and downlink data are transmitted is 1 ms.

Referring to FIG. 2, there are different sub-frames or different timeslots at the same frequency for uplink and downlink transmission, in a frame structure for an existing LTE Time Division Duplex (TDD) system. Where each 10 ms radio frame includes two 5 ms half-frames and each half-frame includes five sub-frames with a length of 1 ms. The sub-frames are categorized into three categories of downlink sub-frames, uplink sub-frames, and special sub-frames, and each special sub-frame includes three components of a Downlink Pilot Time Slot (DwPTS), a Guard Period (GP), and an Uplink Pilot Time Slot (UpPTS). Each half-frame includes at least one downlink sub-frame, at least one uplink sub-frame, and at most one special sub-frame.

As defined in Appendix Section B.2 of 3GPP TR 36.912, a User Plane (U-plane) delay in an LTE system includes four components of a period of time for processing at a base station, a period of time for frame alignment, a period of time for the TTI, and a period of time for processing at a User Equipment (UE), where the period of time for frame alignment refers to a wait period of time between arrival of a service, and allocation of an occasion to transmit the service in an air interface sub-frame.

Taking downlink transmission in the LTE-FDD system as an example, there is a downlink transmission occasion of each sub-frame in the FDD system, the period of time for frame alignment is 0.5 ms on average; the period of time for processing at the base station is 1 ms in a downlink direction, and 1.5 ms in an uplink direction; and the period of time for processing at the UE is 1 ms in the uplink direction, and 1.5 ms in the downlink direction, so in a case that retransmission using a Hybrid Automatic Repeat Request (HARQ) is not considered, a downlink U-plane delay in the LTE-FDD system is a sum of a period of time of 1 ms for processing at the base station, a period of time of 0.5 ms for frame alignment, a period of time of 1 ms for the TTI, and a period of time of 1.5 ms for processing at the UE, i.e., 4 ms; and alike an uplink U-plane delay is also 4 ms in the case that retransmission using the HARQ is not considered in the LTE-FDD system, particularly as illustrated in FIG. 3.

In the LTE-TDD system, the period of time for processing at the base station, the period of time for processing at the UE, and the length of the TTI are the same as those in the LTE-FDD system, and the period of time for frame alignment is related to an arrival time of the service and an uplink-downlink configuration for the system.

Taking an uplink-downlink configuration #5 as an example, if the base station finishes processing by a transmitter in a sub-frame #1, then data will not be transmitted until in a sub-frame #3, so the period of time for frame alignment for transmission to the air interface sub-frame will be 1.5 ms on average, and the periods of time for frame alignment for the remaining sub-frames will be 0.5 ms on average. Thus an average period of time for frame alignment for downlink data is (1.5+8*0.5)/9=0.6 ms.

The U-plane delay is calculated as described above, where all of the period of time for processing at the base station, the period of time for processing at the UE, and the period of time for frame alignment are related to the length of the TTI, and if the length of the TTI is reduced, then the total U-plane delay will be shortened.

In the existing LTE frame structure, the TTI may be shortened to 0.5 ms or less, that is, the length of the TTI is the quantity of symbols in a timeslot in the existing LTE frame structure, e.g., 7 symbols in a timeslot with a normal CP, and 6 symbols in a timeslot with an extended CP; or the TTI can be further shortened to a length of less than a timeslot, e.g., one or more symbols.

However in the LTE system, all the channels are transmitted in a defined length 1 ms of the TTI, and there has been absent so far a definite solution to how to transmit data over a service channel in a TTI with another length than 1 ms.

SUMMARY

Embodiments of the invention provide a method and apparatus for transmitting uplink control information so as to provide a solution to transmit uplink control information in a shortened TTI.

Particular technical solutions according to the embodiments of the invention are as follows.

A method for transmitting uplink control information includes: determining, by a User Equipment (UE), resources for transmitting the uplink control information, wherein the resources include a time domain resource and a frequency domain resource, wherein a length of the time domain resource is less than 1 ms; and transmitting, by the UE, the uplink control information over determined resources. In this way, there is provided a solution to transmit uplink control information in a shortened TTI to thereby support normal feedback of uplink control information so as to guarantee the performance of the system.

Optionally, among the resources for transmitting the uplink control information, which are determined by the UE, a size of the frequency domain resource is represented as the quantity of Sub-Carriers (SCs) or the quantity of Resource Elements (REs) or the quantity of Resource Units (RUs), wherein if the size of the frequency domain resource is represented as the quantity of RUs, then an RU is a predefined resource region occupying X1 symbols in a time domain and X2 SCs or REs in a frequency domain, wherein the X2 SCs or REs are consecutive or inconsecutive, X1 and X2 are predefined or preconfigured, and both X1 and X2 are integers greater than 0; and among the resources for transmitting uplink control information, which are determined by the UE, a size of the time domain resource is represented as the quantity of symbols or a length of time.

Optionally the UE determines a size of the frequency domain resource as fixedly set A1 SCs or A2 REs or A3 RUs, wherein A1, A2, and A3 are integers greater than 0, or the UE determines a size of the frequency domain resource according to signaling, and the UE determines a position of the frequency domain resource according to pre-definition, or the UE determines a position of the frequency domain resource according to signaling; and the UE determines a size of the time domain resource as fixedly set B1 symbols or B2 ms, wherein B1 is an integer greater than 0 and B2 is a fraction less than 1, or the UE determines a size of the time domain resource according to signaling, and the UE determines a position of the time domain resource according to pre-definition, or the UE determines a position of the time domain resource according to signaling.

Optionally determining, by the UE, the resources for transmitting the uplink control information includes: determining, by the UE, the resources for transmitting the uplink control information according to a downlink (DL) grant, wherein an indication field in Downlink Control Information (DCI) used by the DL grant indicates one of a plurality of sets of resources preconfigured via higher-layer signaling; or determining, by the UE, the resources for transmitting the uplink control information according to an uplink (UL) grant, wherein a first indication field in DCI used by the UL grant indicates a size and a position of the frequency domain resource, and a second indication field in the DCI indicates at least a size of the time domain resource; or determining, by the UE, the resources for transmitting the uplink control information according to higher-layer signaling, wherein at least one set of resources is configured by the higher-layer signaling, and when a plurality of sets of resources are configured, the UE selects one of the sets of resources.

Optionally the second indication field further indicates a position of the time domain resource, or a position of the time domain resource is predefined.

Optionally the sets of resources are configured as follows: each set of resources includes the size and the position of the frequency domain resource, and the size of the time domain resource, wherein sizes of the frequency domain resource in different sets of resources are the same or different, and/or sizes of the time domain resource in different sets of resources are the same or different; or the size of the frequency domain resource is a fixed value negotiated between a UE side and a network side, and each set of resources includes the position of the frequency domain resource and the size of the time domain resource, wherein sizes of the time domain resource in different sets of resources are the same or different; or the size of the time domain resource is a fixed value negotiated between a UE side and a network side, and each set of resources includes the size and the position of the frequency domain resource, wherein sizes of the frequency domain resource in different sets of resources are the same or different; or the size of the time domain resource is a fixed value negotiated between a UE side and a network side, the size of the frequency domain resource is a fixed value negotiated about between the UE side and the network side, and each set of resources includes the position of the frequency domain resource.

Optionally in the method, each set of resources further includes the position of the time domain resource, or the position of the time domain resource is predefined.

Optionally selecting, by the UE, one of the sets of resources includes: determining, by the UE, a set of resources to be selected, according to the total quantity of bits of uplink control information to be fed back, and the maximum quantity of bits, which can be carried in each of the sets of resources according to a specific code rate; or when there are different sizes of the time domain resource in different sets of resources, determining, by the UE, a set of resources to be selected, according to sizes of the time domain resource in respective sets of resources; or determining, by the UE, a set of resources to be selected, according to the quantity of symbols in each of the sets of resources.

Optionally if a position of the time domain resource is predefined, then the UE determines a start position of the time domain resource, as follows.

If the uplink control information is Acknowledgement/Non-Acknowledgement (ACK/NACK) feedback information, then the UE operates as follows: the UE determines the start position of the time domain resource as the first symbol in a period of time with an index of n+k. Wherein n is an index of a period of time in which downlink data requiring ACK/NACK feedback are transmitted, k is a predetermined value; or the UE determines the start position of the time domain resource as the first symbol in a k-th pre-allocated period of time for uplink transmission, after a pre-allocated period of time for downlink transmission in which downlink data requiring ACK/NACK feedback are transmitted, wherein k is a predetermined value; or the UE determines the start position of the time domain resource as the first symbol satisfying a preset timing relationship, wherein said symbol is a symbol in a period of time for uplink transmission; or the UE determines the start position of the time domain resource as the first symbol in a period of time for uplink transmission satisfying a preset timing relationship, wherein whether the timing relationship is satisfied is determined by symbol spacing between the last symbol for downlink data transmission, and the first symbol in the period of time for uplink transmission, wherein the timing relationship is a processing delay, and the processing delay includes time for parsing and processing downlink data, and time for generating ACK/NACK feedback information corresponding to the downlink data, and with reference to an end of a transmission of downlink data, ACK/NACK feedback information thereof will be transmitted in an uplink symbol that is not earlier than an uplink symbol satisfying the processing delay.

If the uplink control information is periodic Channel State Information (CSI) feedback information, then the UE operates as follows: the UE determines a position of a start symbol of the time domain resource, according to a preconfigured CSI feedback periodicity, wherein the periodicity is represented as Y1 symbols, and Y1 is a positive integer; or the UE determines a predetermined uplink symbol position in a sub-frame, in which CSI is transmitted, corresponding to a preconfigured CSI feedback periodicity as a position of a start symbol of the time domain resource, according to the CSI feedback periodicity, wherein the CSI feedback periodicity is represented as Y2 sub-frames, and Y2 is a positive integer.

Optionally transmitting, by the UE, the uplink control information over the determined resources includes: transmitting, by the UE, the uplink control information over the determined resources without spreading; or transmitting, by the UE, the uplink control information over the determined resources with spreading.

Optionally transmitting, by the UE, the uplink control information over the determined resources without spreading includes: determining, by the UE, the quantity of code bits according to the quantity of REs, in which data are transmitted, over the determined resources, and a modulation and coding scheme, and performing channel coding and rate matching for the uplink control information based upon the quantity of code bits to obtain corresponding modulated symbols, and mapping, by the UE, the modulated symbols obtained in a specific order onto the determined resources for transmission.

Optionally transmitting, by the UE, the uplink control information over the determined resources with spreading includes: determining, by the UE, the quantity of code bits according to the quantity of REs, in which data are transmitted, over the determined resources, a length of a spreading sequence and a modulation and coding scheme, and performing channel coding and rate matching for the uplink control information based upon the quantity of code bits to obtain corresponding modulated symbols; and multiplying, by the UE, each of the modulated symbols obtained with an orthogonal sequence with a length of N to obtain spread modulated symbols with a length of N, and mapping the spread modulated symbols with the length of N onto an RE group in a symbol in the determined resources for transmission, wherein the RE group includes N REs, and N is a length of the orthogonal sequence.

Optionally when there are a plurality of symbols in the time domain resource, determined by the UE, the method further includes: spreading, by the UE, each symbol in a frequency domain using an orthogonal sequence with a length of N; or spreading, by the UE, each symbol in a time domain using an orthogonal sequence with a length of B, wherein B is the quantity of symbols for transmitting data, among the quantity of symbols in the time domain resource; or spreading, by the UE, each symbol in a frequency domain using an orthogonal sequence with a length of N, and spreading, by the UE, each symbol in a time domain using an orthogonal sequence with a length of B, wherein B is the quantity of symbols for transmitting data, among the quantity of symbols in the time domain resource.

Optionally the method further includes: carrying, by the UE, a specific sequence while transmitting the uplink control information, wherein the specific sequence is related to an identifier (ID) of the UE, and is at least used by another network element to identify the UE and to perform interference measurement on the UE.

An apparatus for transmitting uplink control information includes: a processing unit configured to determine resources for transmitting the uplink control information, wherein the resources include a time domain resource and a frequency domain resource, wherein a length of the time domain resource is less than 1 ms; and a communicating unit configured to transmit the uplink control information over determined resources. In this way, there is provided a solution to transmit uplink control information in a shortened TTI to thereby support normal feedback of uplink control information so as to guarantee the performance of the system.

Optionally, among the resources for transmitting uplink control information, which are determined by the processing unit, a size of the frequency domain resource is represented as the quantity of Sub-Carriers (SCs) or the quantity of Resource Elements (REs) or the quantity of Resource Units (RUs), wherein if the size of the frequency domain resource is represented as the quantity of RUs, then an RU is a predefined resource region occupying X1 symbols in a time domain and X2 SCs or REs in a frequency domain, wherein the X2 SCs or REs are consecutive or inconsecutive, X1 and X2 are predefined or preconfigured, and both X1 and X2 are integers greater than 0; and among the resources for transmitting the uplink control information, which are determined by the processing unit, a size of the time domain resource is represented as the quantity of symbols or a length of time.

Optionally the processing unit determines a size of the frequency domain resource as fixedly set A1 SCs or A2 REs or A3 RUs, wherein A1, A2, and A3 are integers greater than 0, or the processing unit determines a size of the frequency domain resource according to signaling, and the processing unit determines a position of the frequency domain resource according to pre-definition, or the processing unit determines a position of the frequency domain resource according to signaling; and the processing unit determines a size of the time domain resource as fixedly set B1 symbols or B2 ms, wherein B1 is an integer greater than 0 and B2 is a fraction less than 1, or the processing unit determines a size of the time domain resource according to signaling, and the processing unit determines a position of the time domain resource according to pre-definition, or the processing unit determines a position of the time domain resource according to signaling.

Optionally the processing unit is configured to determine the resources for transmitting the uplink control information by: determining the resources for transmitting the uplink control information according to a downlink (DL) grant, wherein an indication field in Downlink Control Information (DCI) used by the DL grant indicates one of a plurality of sets of resources preconfigured via higher-layer signaling; or determining the resources for transmitting the uplink control information according to an uplink (UL) grant, wherein a first indication field in DCI used by the UL grant indicates a size and a position of the frequency domain resource, and a second indication field in the DCI indicates at least a size of the time domain resource; or determining the resources for transmitting the uplink control information according to higher-layer signaling, wherein at least one set of resources is configured by the higher-layer signaling, and when a plurality of sets of resources are configured, the processing unit selects one of the sets of resources.

Optionally when the processing unit determines the resources for transmitting the uplink control information according to the UL grant, wherein the first indication field in the DCI used by the UL grant indicates the size and the position of the frequency domain resource, and the second indication field in the DCI indicates at least the size of the time domain resource, the second indication field further indicates a position of the time domain resource, or a position of the time domain resource is predefined.

Optionally when the processing unit determines the resources for transmitting the uplink control information according to the DL grant, wherein the indication field in the DCI used by the DL grant indicates one of a plurality of sets of resources preconfigured higher-layer signaling, or the processing unit determines the resources for transmitting the uplink control information according to the higher-layer signaling, wherein at least one set of resources is configured by the higher-layer signaling, and when a plurality of sets of resources are configured, the processing unit selects one of the sets of resources as follows: each set of resources includes the size and the position of the frequency domain resource, and the size of the time domain resource, wherein sizes of the frequency domain resource in different sets of resources are the same or different, and/or sizes of the time domain resource in different sets of resources are the same or different; or the size of the frequency domain resource is a fixed value negotiated between a UE side and a network side, and each set of resources includes the position of the frequency domain resource and the size of the time domain resource, wherein sizes of the time domain resource in different sets of resources are the same or different; or the size of the time domain resource is a fixed value negotiated between a UE side and a network side, and each set of resources includes the size and the position of the frequency domain resource, wherein sizes of the frequency domain resource in different sets of resources are the same or different; or the size of the time domain resource is a fixed value negotiated between a UE side and a network side, the size of the frequency domain resource is a fixed value negotiated between the UE side and the network side, and each set of resources includes the position of the frequency domain resource.

Optionally in the apparatus, each set of resources further includes the position of the time domain resource, or the position of the time domain resource is predefined.

Optionally when the processing unit determines the resources for transmitting the uplink control information according to the higher-layer signaling, wherein at least one set of resources is configured by the higher-layer signaling, and when a plurality of sets of resources are configured, the processing unit is configured to select one of the sets of resources by: determining a set of resources to be selected, according to the total quantity of bits of uplink control information to be fed back, and the maximum quantity of bits, which can be carried in each of the sets of resources according to a specific code rate; or when there are different sizes of the time domain resource in different sets of resources, determining a set of resources to be selected, according to sizes of the time domain resource in respective sets of resources; or determining a set of resources to be selected, according to the quantity of symbols in each of the sets of resources.

Optionally if a position of the time domain resource is predefined, then the processing unit determines a start position of the time domain resource, as follows: if the uplink control information is Acknowledgement/Non-Acknowledgement (ACK/NACK) feedback information, then the processing unit determines the start position of the time domain resource as the first symbol in a period of time with an index of n+k, wherein n is an index of a period of time in Which downlink data requiring ACK/NACK feedback are transmitted, k is a predetermined value; or the processing unit determines the start position of the time domain resource as the first symbol in a k-th pre-allocated period of time for uplink transmission, after a pre-allocated period of time for downlink transmission in which downlink data requiring ACK/NACK feedback are transmitted, wherein k is a predetermined value; or the processing unit determines the start position of the time domain resource as the first symbol satisfying a preset timing relationship, wherein said symbol is a symbol in a period of time for uplink transmission; or the processing unit determines the start position of the time domain resource as the first symbol in a period of time for uplink transmission satisfying a preset timing relationship, wherein whether the timing relationship is satisfied is determined by symbol spacing between the last symbol for downlink data transmission, and the first symbol in the period of time for uplink transmission, wherein the timing relationship is a processing delay, wherein the processing delay includes time for parsing and processing downlink data, and time for generating ACK/NACK feedback information corresponding to the downlink data, and with reference to an end of a transmission of downlink data, ACK/NACK feedback information thereof will be transmitted in an uplink symbol that is not earlier than an uplink symbol satisfying the processing delay; and if a position of the time domain resource is predefined, and the uplink control information is periodic Channel State information (CSI) feedback information, then the processing unit is configured to determine a position of a start symbol of the time domain resource according to a preconfigured CSI feedback periodicity, wherein the periodicity is represented as Y1 symbols, and Y1 is a positive integer, or the processing unit is configured to determine a predetermined uplink symbol position in a sub-frame, in which CSI is transmitted, corresponding to a preconfigured CSI feedback periodicity as a position of a start symbol of the time domain resource, according to the CSI feedback periodicity, wherein the CSI feedback periodicity is represented as Y2 sub-frames, and Y2 is a positive integer.

Optionally the communicating unit is configured to transmit the uplink control information over the determined resources by transmitting the uplink control information over the determined resources without spreading; or transmitting the uplink control information over the determined resources with spreading.

Optionally the communicating unit is configured to transmit the uplink control information over the determined resources without spreading by: determining the quantity of code bits according to the quantity of REs, in which data are transmitted, over the determined resources, and a modulation and coding scheme, and performing channel coding and rate matching for the uplink control information based upon the quantity of code bits to obtain corresponding modulated symbols; and mapping the modulated symbols obtained in a specific order onto the determined resources for transmission.

Optionally the communicating unit is configured to transmit the uplink control information over the determined resources with spreading by: determining the quantity of code bits according to the quantity of REs, in which data are transmitted, over the determined resources, a length of a spreading sequence and a modulation and coding scheme, and performing channel coding and rate matching for the uplink control information based upon the quantity of code bits to obtain corresponding modulated symbols; and multiplying each of the modulated symbols obtained with an orthogonal sequence with a length of N to obtain spread modulated symbols with a length of N, and mapping the spread modulated symbols with the length of N onto an RE group in a symbol in the determined resources for transmission, wherein the RE group includes N REs, and N is a length of the orthogonal sequence.

Optionally when there are a plurality of symbols in the determined time domain resource, the communicating unit is further configured to: spread each symbol in a frequency domain using an orthogonal sequence with a length of N; or spread each symbol in a time domain using an orthogonal sequence with a length of B, wherein B is the quantity of symbols for transmitting data, among the quantity of symbols in the time domain resource; or spread each symbol in a frequency domain using an orthogonal sequence with a length of N, and spread each symbol in a time domain using an orthogonal sequence with a length of B, wherein B is the quantity of symbols for transmitting data, among the quantity of symbols in the time domain resource.

Optionally the communicating unit is further configured to: carry a specific sequence while transmitting the uplink control information, wherein the specific sequence is related to an identifier (ID) of the apparatus, and is at least used by another network element to identify the apparatus and to perform interference measurement on the apparatus.

An apparatus for transmitting uplink control information, includes a processor configured to read programs in a memory to execute following operations: determining resources for transmitting the uplink control information, wherein the resources include a time domain resource and a frequency domain resource, wherein a length of the time domain resource is less than 1 ms; and a transceiver configured to transmit the uplink control information over determined resources under the control of the processor. In this way, there is provided a solution to transmit uplink control information in a shortened TTI to thereby support normal feedback of uplink control information so as to guarantee the performance of the system.

Optionally, among the resources for transmitting the uplink control information, which are determined by the processor, a size of the frequency domain resource is represented as the quantity of Sub-Carriers (SCs) or the quantity of Resource Elements (REs) or the quantity of Resource Units (RUs), wherein if the size of the frequency domain resource is represented as the quantity of RUs, then an RU is a predefined resource region occupying X1 symbols in a time domain and X2 SCs or REs in a frequency domain, Wherein the X2 SCs or REs are consecutive or inconsecutive, X1 and X2 are predefined or preconfigured, and both X1 and X2 are integers greater than 0; and among the resources for transmitting the uplink control information, which are determined by the processor, a size of the time domain resource is represented as the quantity of symbols or a length of time.

Optionally the processor determines a size of the frequency domain resource as fixedly set A1 SCs or A2 REs or A3 RUs, wherein A1, A2, and A3 are integers greater than 0, or the processor determines a size of the frequency domain resource according to signaling, and the processor determines a position of the frequency domain resource according to pre-definition, or the processor determines a position of the frequency domain resource according to signaling; and the processor determines a size of the time domain resource as fixedly set B1 symbols or B2 ms, wherein B1 is an integer greater than 0 and B2 is a fraction less than 1, or the processor determines a size of the time domain resource according to signaling, and the processor determines a position of the time domain resource according to pre-definition, or the processor determines a position of the time domain resource according to signaling.

Optionally the processor is configured to determine the resources for transmitting the uplink control information by: determining the resources for transmitting the uplink control information according to a downlink (DL) grant, wherein an indication field in Downlink Control Information (DCI) used by the DL grant indicates one of a plurality of sets of resources preconfigured via higher-layer signaling; or determining the resources for transmitting the uplink control information according to an uplink (UL) grant, wherein a first indication field in DCI used by the UL grant indicates a size and a position of the frequency domain resource, and a second indication field in the DCI indicates at least a size of the time domain resource; or determining the resources for transmitting the uplink control information according to higher-layer signaling, wherein at least one set of resources is configured by the higher-layer signaling, and when a plurality of sets of resources are configured, the processor selects one of the sets of resources.

Optionally when the processor determines the resources for transmitting the uplink control information according to the UL grant, wherein the first indication field in the DCI used by the UL grant indicates the size and the position of the frequency domain resource, and the second indication field in the DCI indicates at least the size of the time domain resource, the second indication field further indicates a position of the time domain resource, or a position of the time domain resource is predefined.

Optionally when the processor determines the resources for transmitting the uplink control information according to the DL grant, wherein the indication field in the DCI used by the DL grant indicates one of a plurality of sets of resources preconfigured via higher-layer signaling, or the processor determines the resources for transmitting the uplink control information according to the higher-layer signaling, wherein at least one set of resources is configured by the higher-layer signaling, and when a plurality of sets of resources are configured, the processor is configured to select one of the sets of resources as follows: each set of resources includes the size and the position of the frequency domain resource, and the size of the time domain resource, wherein sizes of the frequency domain resource in different sets of resources are the same or different, and/or sizes of the time domain resource in different sets of resources are the same or different; or the size of the frequency domain resource is a fixed value negotiated between a UE side and a network side, and each set of resources includes the position of the frequency domain resource and the size of the time domain resource, wherein sizes of the time domain resource in different sets of resources are the same or different; or the size of the time domain resource is a fixed value negotiated between a UE side and a network side, and each set of resources includes the size and the position of the frequency domain resource, wherein sizes of the frequency domain resource in different sets of resources are the same or different; or the size of the time domain resource is a fixed value negotiated between a UE side and a network side, the size of the frequency domain resource is a fixed value negotiated between the UE side and the network side, and each set of resources includes the position of the frequency domain resource.

Optionally in the apparatus, each set of resources further includes the position of the time domain resource, or the position of the time domain resource is predefined.

Optionally when the processor determines the resources for transmitting the uplink control information according to the higher-layer signaling, wherein at least one set of resources is configured by the higher-layer signaling, and when a plurality of sets of resources are configured, the processor is configured to select one of the sets of resources by: determining a set of resources to be selected, according to the total quantity of bits of uplink control information to be fed back, and the maximum quantity of bits, which can be carried in each of the sets of resources according to a specific code rate; or when there are different sizes of the time domain resource in different sets of resources, determining a set of resources to be selected, according to sizes of the time domain resource in respective sets of resources; or determining a set of resources to be selected, according to the quantity of symbols in each of the sets of resources.

Optionally if a position of the time domain resource is predefined, then the processor determines a start position of the time domain resource, as follows: if the uplink control information is Acknowledgement/Non-Acknowledgement (ACK/NACK) feedback information, then the processor determines the start position of the time domain resource as the first symbol in a period of time with an index of n+k, wherein n is an index of a period of time in which downlink data requiring ACK/NACK feedback are transmitted, k is a predetermined value; or the processor determines the start position of the time domain resource as the first symbol in a k-th pre-allocated period of time for uplink transmission, after a pre-allocated period of time for downlink transmission in which downlink data requiring ACK/NACK feedback are transmitted, wherein k is a predetermined value; or the processor determines the start position of the time domain resource as the first symbol satisfying a preset timing relationship, wherein said symbol is a symbol in a period of time for uplink transmission; or the processor determines the start position of the time domain resource as the first symbol in a period of time for uplink transmission satisfying a preset timing relationship, wherein whether the timing relationship is satisfied is determined by symbol spacing between the last symbol for downlink data transmission, and the first symbol in the period of time for uplink transmission, wherein the timing relationship is a processing delay, wherein the processing delay includes time for parsing and processing downlink data, and time for generating ACK/NACK feedback information corresponding to the downlink data, and with reference to an end of a transmission of downlink data, ACK/NACK feedback information thereof will be transmitted in an uplink symbol that is not earlier than an uplink symbol satisfying the processing delay.

If the uplink control information is periodical Channel State Information (CSI) feedback information, then the processor is configured to: determine a position of a start symbol of the time domain resource, according to a preconfigured CSI feedback periodicity, wherein the periodicity is represented as Y1 symbols, and Y1 is a positive integer; or determine a predetermined uplink symbol position in a sub-frame, in which CSI is transmitted, corresponding to a preconfigured CSI feedback periodicity as a position of a start symbol of the time domain resource, according to the CSI feedback periodicity, wherein the CSI feedback periodicity is represented as Y2 sub-frames, and Y2 is a positive integer.

Optionally the transceiver is configured to transmit the uplink control information over the determined resources by transmitting the uplink control information over the determined resources without spreading; or transmitting the uplink control information over the determined resources with spreading.

Optionally the transceiver is configured to transmit the uplink control information over the determined resources without spreading by: determining the quantity of code bits according to the quantity of REs, in which data are transmitted, over the determined resources, and a modulation and coding scheme, and performing channel coding and rate matching for the uplink control information based upon the quantity of code bits to obtain corresponding modulated symbols; and mapping the modulated symbols obtained in a specific order onto the determined resources for transmission.

Optionally the transceiver is configured to transmit the uplink control information over the determined resources with spreading by: determining the quantity of code bits according to the quantity of REs, in which data are transmitted, over the determined resources, a length of a spreading sequence and a modulation and coding scheme, and performing channel coding and rate matching for the uplink control information based upon the quantity of code bits to obtain corresponding modulated symbols; and multiplying each of the modulated symbols obtained with an orthogonal sequence with a length of N to obtain spread modulated symbols with a length of N, and mapping the spread modulated symbols with the length of N onto an RE group in a symbol in the determined resources for transmission, wherein the RE group includes N REs, and N is a length of the orthogonal sequence.

Optionally when there are a plurality of symbols in the time domain resource, the transceiver is further configured to: spread each symbol in a frequency domain using an orthogonal sequence with a length of N; or spread each symbol in a time domain using an orthogonal sequence with a length of B, wherein B is the quantity of symbols for transmitting data, among the quantity of symbols in the time domain resource; or spread each symbol in a frequency domain using an orthogonal sequence with a length of N, and spread each symbol in a time domain using an orthogonal sequence with a length of B, wherein B is the quantity of symbols for transmitting data, among the quantity of symbols in the time domain resource.

Optionally the transceiver is further configured to: carry a specific sequence while transmitting the uplink control information, wherein the specific sequence is related to an identifier (ID) of the apparatus, and is at least used by another network element to identify the apparatus and to perform interference measurement on the apparatus.

DETAILED DESCRIPTION OF THE EMBODIMENTS

Preferable embodiments of the invention will be described below in further details with reference to the drawings.

Figure 1:
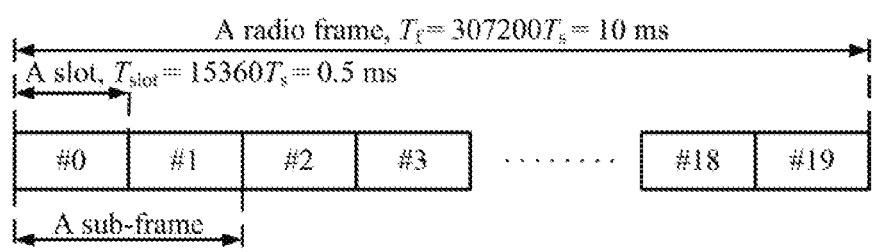
FIG. 1 is a schematic diagram of a frame structure in a LTE FDD system in the prior art.
Figure 2:
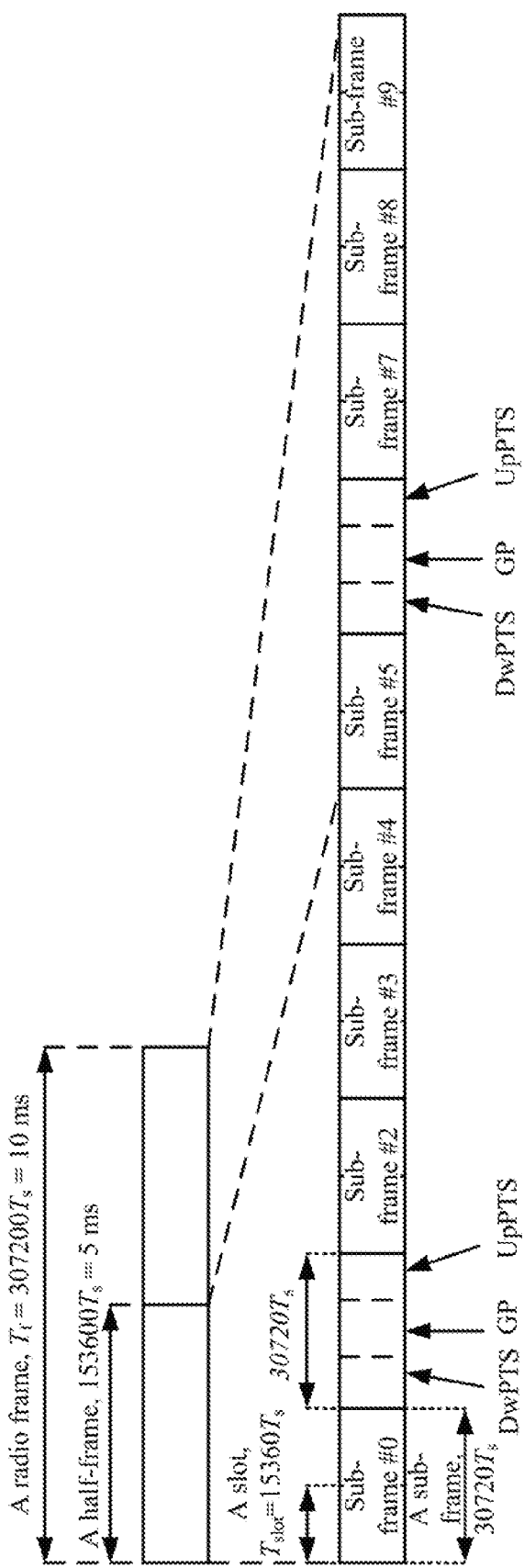
FIG. 2 is a schematic diagram of a frame structure in a LTE TDD system in the prior art.
Figure 3:
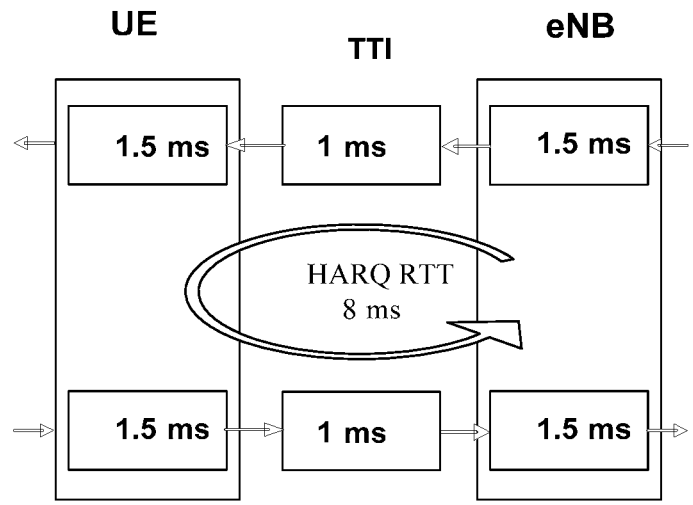
FIG. 3 is a schematic diagram of an uplink U-plane delay in a case that retransmission using an HARQ is not considered in a LTE FDD system.
Figure 4:
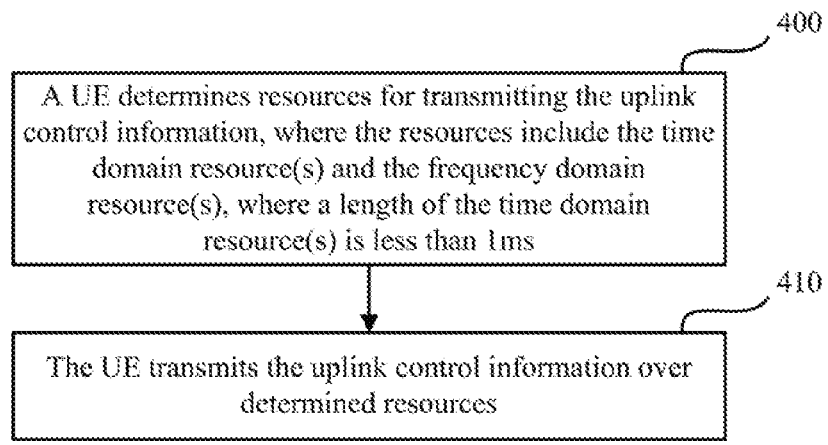
FIG. 4 is a flow chart of transmitting uplink control information according to embodiments of the invention.

Referring to FIG. 4, a detailed flow of transmitting uplink control information according to an embodiment of the invention is as follows.

In an operation 400, a UE determines resources for transmitting the uplink control information, where the resources include the time domain resources) and the frequency domain resource(s), where a length of the time domain resource(s) is less than 1 ms.

In an operation 410, the UE transmits the uplink control information over determined resources.

Particularly in the operation 400, of the resources for transmitting the uplink control information, which are determined by the UE, a size of the frequency domain resource(s) is represented as the quantity of Sub-Carriers (SCs) or the quantity of Resource Elements (REs) or the quantity of Resource Units (RUs), where if the size of the frequency domain resource(s) is represented as the quantity of RUs, then an RU is a predefined resource region occupying X1 symbols in a time domain, and X2 SCs or REs in a frequency domain, where the X2 SCs or REs are consecutive or inconsecutive, X1 and X2 are predefined or preconfigured, and both X1 and X2 are integers greater than 0.

The UE determines the size of the frequency domain resource(s) as fixedly set A1 SCs or A2 REs or A3 RUs, where A1, A2, and A3 are integers greater than 0, or the UE determines the size of the frequency domain resource(s) according to signaling; and the UE determines the position(s) of the frequency domain resource(s) according to pre-definition, or the UE determines the position(s) of the frequency domain resource(s) according to signaling. Optionally the signaling can be carried in a broadcast, Downlink Control Information (DCI). or Radio Resource Control (RRC) information.

On the other hand, of the resources for transmitting the uplink control information, which are determined by the UE, a size of the time domain resource(s) is represented as the quantity of symbols or a length of time.

The UE determines the size of the time domain resource(s) as fixedly set B1 symbols or B2 ms, where B1 is an integer greater than 0 and B2 is a fraction less than 1, or the UE determines the size of the time domain resource(s) according to signaling; and the UE determines the position(s) of the time domain resource(s) according to pre-definition, or the UE determines the position(s) of the time domain resource(s) according to signaling. Optionally the signaling can be carried in a broadcast, DCI, or RRC information.

In the embodiment of the invention, the UE can determine the resources for transmitting the uplink control information in the operation 400 in one of the following methods without any limitation thereto.

In a method A, the UE determines the resources for transmitting the uplink control information according to a downlink (DL) grant, where an indication field in DCI used by the DL grant indicates one of a plurality of sets of resources preconfigured via higher-layer signaling.

Particularly the DL grant indicates one of the plurality of sets of resources preconfigured via the higher-layer signaling, in an ACK/NACK Resource Indication (ARI) field in the carried DCI.

In the method A, the UE is pre-configured with the plurality of sets of resources via the higher-layer signaling, and a network side instructs the UE via the DL grant to transmit uplink control information over resources indicated by one of the sets of resources. In order to lower an overhead of system resources, the network side can configure a plurality of UEs with the plurality of sets of resources via the higher-layer signaling, and further instruct different UEs via the DL grant to access different sets of resources in the same sub-frame.

Particularly the sets of resources can be configured in one of the following methods without any limitation thereto.

In a method A-1, both the sizes of the frequency domain resource(s) and the time domain resource(s) are variable.

Each set of resources includes the size and the position(s) of the frequency domain resource(s), and the size of the time domain resource(s), where sizes of the frequency domain resource(s) in different sets of resources are the same or different, and/or sizes of the time domain resource(s) in different sets of resources are the same or different.

Furthermore each set of resources includes the position(s) of the time domain resource(s), or the position(s) of the time domain resource is (or are) predefined.

In a method A-2, the size of the frequency domain resource(s) is fixed, and the size of the time domain resource(s) is variable.

The size of the frequency domain resource(s) is a fixed value negotiated between the UE side and the network side, and each set of resources includes the position(s) of the frequency domain resource(s) and the size of the time domain resource(s), where sizes of the time domain resource(s) in different sets of resources are the same or different; or each set of resources includes only the position(s) of the frequency domain resource(s), and the size of the time domain resource(s) is indicated in another bit or other bits in the DL grant.

Furthermore each set of resources includes the position(s) of the time domain resource(s), or the position(s) of the time domain resource(s) is (or are) predefined.

In a method A-3, the size of the frequency domain resource(s) is variable, and the size of the time domain resource(s) is fixed.

The size of the time domain resource(s) is a fixed value negotiated between the UE side and the network side, and each set of resources includes the size and the position(s) of the frequency domain resource(s), where sizes of the frequency domain resource(s) in different sets of resources are the same or different.

Furthermore each set of resources includes the position(s) of the time domain resource(s), or the position(s) of the time domain resource(s) is (or are) predefined.

In a method A-4, the size of the frequency domain resource(s) is fixed, and the size of the time domain resource(s) is fixed.

The size of the time domain resource(s) is a fixed value negotiated between the UE side and the network side, the size of the frequency domain resource(s) is a fixed value negotiated between the UE side and the network side, and each set of resources includes the position(s) of the frequency domain resource(s).

Furthermore each set of resources includes the position(s) of the time domain resource(s), or the position(s) of the time domain resource(s) is (or are) predefined.

Furthermore a Transmit Power Control (TPC) field or an ACK/NACK Resource Offset (ARO) indication field in the DCI carried in the DL grant is reused as the ARI field in the DCI, or the ARI field is a predefined quantity of bits.

In a method B, the UE determines the resources for transmitting the uplink control information according to an uplink (UL) grant, where a first indication field in DCI used by the UL grant indicates the size and the position(s) of the frequency domain resource(s), and a second indication field in the DCI indicates at least the size of the time domain resource(s).

Furthermore the second indication field can indicate the position(s) of the time domain resource(s), or if the second indication field does not indicate the position(s) of the time domain resource(s), then the position(s) of the time domain resource(s) will be position(s) predefined.

In a method C, the UE determines the resources for transmitting the uplink control information according to higher-layer signaling, where at least one set of resources (one or more sets of resources) is configured by the higher-layer signaling, and when a plurality of sets of resources are configured, the UE selects one of the sets of resources. The method C is applicable to periodical feedback information of Channel State Information (CSI).

Particularly the sets of resources can be configured in one of the following methods without any limitation thereto.

In a method C-1, both the sizes of the frequency domain resource(s) and the time domain resource(s) are variable.

Each set of resources includes the size and the position(s) of the frequency domain resource(s), and the size of the time domain resource(s), where sizes of the frequency domain resource(s) in different sets of resources are the same or different, and/or sizes of the time domain resource(s in different sets of resources are the same or different.

Furthermore each set of resources includes the position(s) of the time domain resource(s), or the position(s) of the time domain resource(s) is (or are) predefined.

In a method C-2, the size of the frequency domain resources) is fixed, and the size of the time domain resource(s) is variable.

The size of the frequency domain resource(s) is a fixed value negotiated between the UE side and the network side, and each set of resources includes the position(s) of the frequency domain resource(s) and the size of the time domain resource(s), where sizes of the time domain resource(s) in different sets of resources are the same or different.

Furthermore each set of resources includes the position(s) of the time domain resource(s), or the position(s) of the time domain resource(s) is (or are) predefined.

In a method C-3, the size of the frequency domain resource(s) is variable, and the size of the time domain resource(s) is fixed.

The size of the time domain resource(s) is a fixed value negotiated between the UE side and the network side, and each set of resources includes the size and the position(s) of the frequency domain resource(s), where sizes of the frequency domain resource(s) in different sets of resources are the same or different.

Furthermore each set of resources includes the position(s) of the time domain resource(s), or the position(s) of the time domain resource(s) is (or are) predefined.

In a method C-4, the size of the frequency domain resources) is fixed, and the size of the time domain resource(s) is fixed.

The size of the time domain resource(s) is a fixed value negotiated between the UE side and the network side, the size of the frequency domain resource(s) is a fixed value negotiated between the UE side and the network side, and each set of resources includes the position(s) of the frequency domain resource(s).

Furthermore each set of resources includes the position(s) of the time domain resource(s), or the position(s) of the time domain resource(s) is (or are) predefined.

In the method C, if two sets of resources are configured by the higher-layer signaling, then the UE may select one of the sets of resources in one of the following schemes without any limitation thereto.

In a selection scheme 1, the UE determines a set of resources to be selected, according to the total quantity of bits of uplink control information to be ted back, and the maximum quantity of bits, which can be carried in each of the sets of resources according to a specific code rate; or when there are different sizes of the time domain resource(s) in different sets of resources, the UE determines a set of resources to be selected, according to sizes of the time domain resources) in respective sets of resources.

For example, when the total quantity of bits of uplink control information does not exceed a smallest one of the maximum quantities of bits, which can be carried in different sets of resources, the UE selects a set of resources corresponding to the smallest one of the maximum quantifies of bits, otherwise, the UE selects another set of resources.

In a selection scheme 2, the UE determines a set of resources to be selected, according to the quantity of symbols in each of the sets of resources.

For example, the UE selects a set of resources with the quantity of symbols thereof being less than the largest quantity of symbols in a current period of time for uplink transmission.

If all of the sets of resources satisfy the condition above, or neither of the sets of resources satisfies the condition above, then the selection scheme 1 will be further applied.

Furthermore when the position(s) of the time domain resource(s) is (or are) predefined, the UE can determine a start position of the time domain resource(s) differently in different cases, and since the size of the time domain resource(s) can be fixed or indicated in the set of resources, after the start position of the time domain resource(s) is obtained, particular position(s) of the time domain resource(s) can be determined, i.e., a plurality of consecutive symbols starting with the start position.

In a first case, if the uplink control information is ACK/NACK feedback information, then the UE may determine the start position of the time domain resource(s) in one of the following schemes without any limitation thereto.

In a scheme A, the UE determines the start position of the time domain resource(s) as the first symbol in a period of time with an index of n+k, where n is an index of a period of time in which downlink data requiring ACK/NACK feedback are transmitted, k is a predetermined value, and both n and k are integers greater than or equal to 0.

In a scheme B, the UE determines the start position of the time domain resource(s) as the first symbol in a k-th pre-allocated period of time for uplink transmission, after a pre-allocated period of time for downlink transmission, in which downlink data requiring ACK/NACK feedback are transmitted, where k is a predetermined value.

In a scheme C, the UE determines the start position of the time domain resource(s) as the first symbol satisfying a preset timing relationship, where said symbol is a symbol in a period of time for uplink transmission.

In a scheme D, the UE determines the start position of the time domain resource(s) the first symbol in a period of time for uplink transmission satisfying a preset timing relationship, where whether the timing relationship is satisfied is determined by symbol spacing between the last symbol for downlink data transmission, and the first symbol in the period of time for uplink transmission.

Here the timing relationships as referred to in the scheme C and the scheme D are particularly embodied as a processing delay, where the processing delay includes time for parsing and processing downlink data, and time for generating ACK/NACK feedback information corresponding to the downlink data. With reference to an end of a transmission of downlink data, ACK/NACK feedback information thereof will be transmitted in the uplink symbol(s) that is (or are) not earlier than an uplink symbol satisfying the processing delay.

For example, the processing delay is particularly embodied as a*b, where a is a predetermined constant, a=3, and b is the quantity of symbols or a length of time, occupied for transmitting downlink data.

In a second case, if the uplink control information is periodic CSI feedback information, then the UE may determine the start position of the time domain resource(s), in one of the following schemes without any limitation thereto.

In a scheme E, the UE determines a position of a start symbol of the time domain resource(s), according to a preconfigured CSI feedback periodicity, where the periodicity is particularly embodied as Y1 symbols, and Y1 is a positive integer.

In a scheme F, the UE determines a predetermined uplink symbol position in a sub-frame, in which CSI is transmitted, corresponding to a preconfigured CSI feedback periodicity as a position of a start symbol of the time domain resource(s), according to the CSI feedback periodicity, where the CSI feedback periodicity is particularly embodied as Y2 sub-frames, and Y2 is a positive integer.

For example, the start position of the frequency domain resource(s) is the first symbol in the first or last period of time for uplink transmission, in the CSI sub-frame.

In another example, when there is also ACK/NACK feedback information in the CSI sub-frame, the start position of the frequency domain resource(s) is a position of a symbol, in which the ACK/NACK feedback information is transmitted, in the CSI sub-frame.

In the embodiment of the invention, the UE can transmit the uplink control information over the determined resources without spreading or with spreading in the operation 410 particularly as follows.

In a method 1, the UE transmits the uplink control information over the determined resources without spreading as follows.

Firstly the UE determines the quantity of code bits according to the quantity of REs, in which data can be transmitted, over the determined resources, and a modulation and coding scheme, and further performs channel coding and rate matching for the uplink control information based upon the quantity of code bits to obtain corresponding modulated symbols.

Optionally a scheme of channel coding above can be the Cyclic Redundancy Check (CRC) plus Turbo Coding scheme, or the Tail Biting Convolutional Coding (TBCC) scheme, e.g., the 8-bit CRC plus TBCC scheme e., the PUCCH Format 4/5 scheme), or the 24-bit CRC plus Turbo Coding scheme.

Secondly the UE maps the obtained modulated symbols in a specific order onto the determined resources for transmission.

For example, the symbols can be mapped into firstly the frequency domain and then the time domain, or can be mapped into firstly the time domain and then the frequency domain.

Furthermore if the resources are over a PUSCH, then the UE will transmit the uplink control information together with data serially, and process the uplink control information in the same way as the data.

In a method 2, the UE transmits the uplink control information over the determined resources with spreading, where an Orthogonal Cover Code (OCC) can be used in this spreading mode particularly as follows.

Firstly the UE determines the quantity of code bits according to the quantity of REs, in which data can be transmitted, over the determined resources, a length of a spreading sequence and a modulation and coding scheme, and further performs channel coding and rate matching for the uplink control information based upon the quantity of code bits to obtain corresponding modulated symbols.

Secondly the UE multiples each of the obtained modulated symbols with an orthogonal sequence with a length of N to obtain the spread modulated symbols with a length of N, and furthers maps the spread modulated symbols with the length of N onto an RE group in a symbol in the frequency domain resource(s) among the determined resources for transmission, where the RE group includes N REs; and OCC spreading is performed on every N REs in a group in the symbol in the frequency domain, over the frequency domain resource(s) among the determined resources, where N is a length of the orthogonal sequence, and N is an integer greater than 1.

Here all the obtained modulated symbols are mapped onto an RE group in the symbol above for transmission, and REs in the RE group are distributed consecutively or discretely in the frequency domain; and/or the different obtained modulated symbols are mapped onto REs in different RE groups in the symbol above for transmission, and REs in these RE groups are distributed in parallel or alternately in the frequency domain.

Furthermore when there are a plurality of symbols in the time domain resource(s), which are determined by the UE the UE spreads each symbol in the frequency domain using an orthogonal sequence with the length of N as described above; or the UE spreads each symbol in the time domain using an orthogonal sequence with a length of B, where B is the quantity of symbols for transmitting data, among the quantity of symbols in the time domain resource(s); or the UE spreads each symbol in the frequency domain using an orthogonal sequence with the length of N, and the UE spreads each symbol in the time domain using an orthogonal sequence with the length of B, where B is the quantity of symbols for transmitting data, among the quantity of symbols in the time domain resource(s), and B is an integer greater than or equal to 1.

On the other hand, the quantity of pilots are spread in the same way as described above, or when pilots are transmitted using a data transmission bandwidth in a symbol, the pilots can be spread in a cyclic shifting mode, where the spacing of cyclic shifting is related to the length of a pilot sequence, and shall satisfy that floor (the length of the pilot sequence/the spacing of cyclic shifting) be no less than N, or be no less than N*M, where floor represents rounding down.

Furthermore the UE transmitting the uplink control information can further carry a specific sequence, where the specific sequence is related to an identifier (ID) of the UE and is at least used by another network element (another UE and/or a base station) to identify the UE and to perform interference measurement on the UE, where the another UE includes a UE in a current cell and/or an adjacent cell.

For example, the specific sequence is generated based upon a ZC sequence, an m sequence, a CAZAC sequence, or another sequence; but the specific sequence can alternatively be generated otherwise as long as it can be related to the ID of the UE, highly auto-correlated, and less cross-correlated.

The OCC spreading mode will be described below in details in connection with a particular example thereof A particular OCC spreading mode will be described in the following example, but will not be limited thereto.

Figure 5:
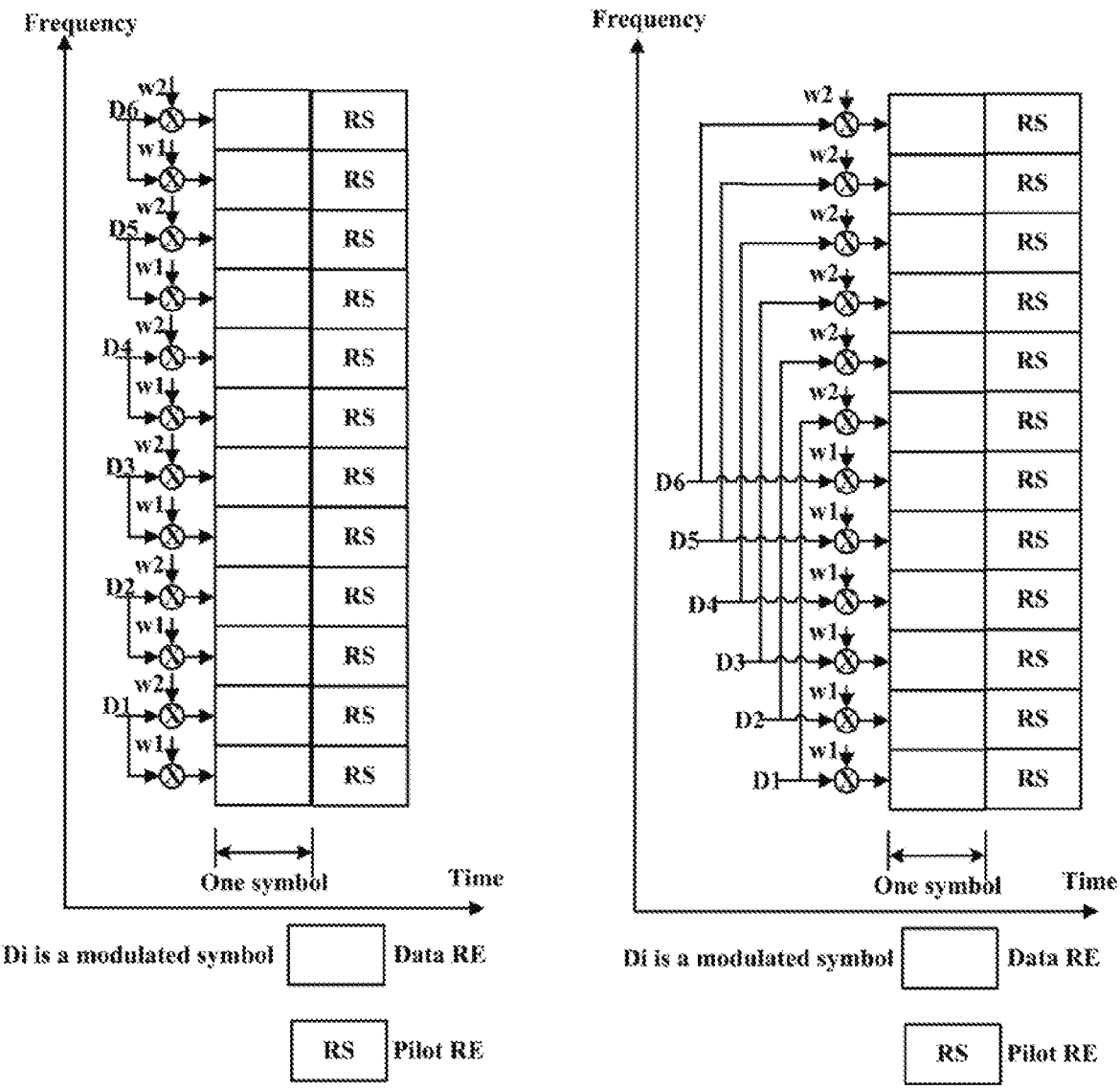
FIG. 5 to FIG. 12 are schematic diagrams respectively of pilot patterns in a frequency spreading mode according to the embodiments of the invention.
Figure 6:
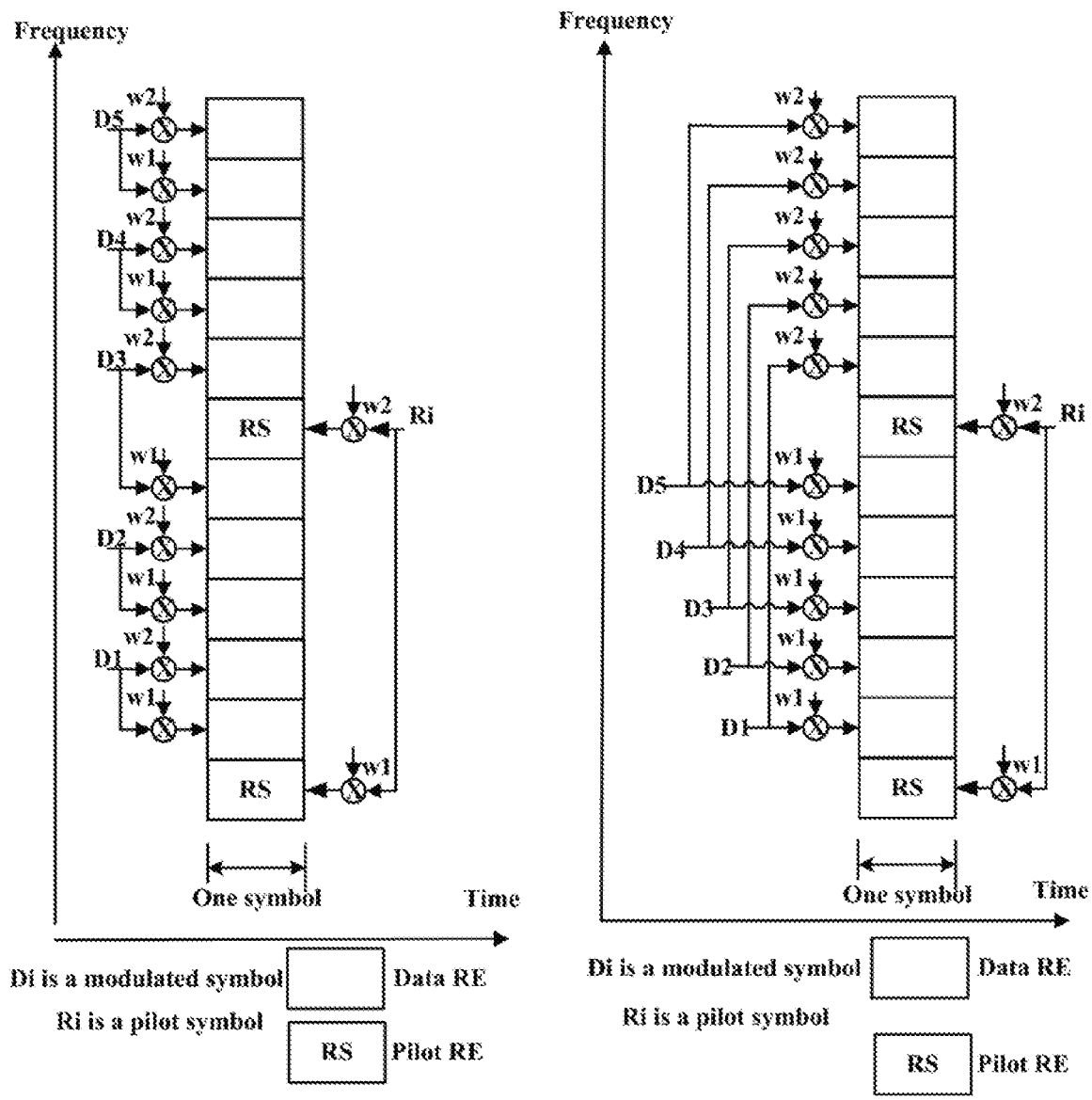

If the quantity of symbols in which uplink control information is transmitted (i.e., SC-FDMA symbols, where the same will apply hereinafter, although a repeated description thereof will be omitted) is 1, then spreading in the frequency domain and mapping using an OCC with a length N of 2 will be as illustrated in FIG. 5 and FIG. 6 taking a region of 12 REs (or SCs) in the frequency domain as an example.

For example, the quantity of symbols in which uplink control information is transmitted is 3, and a region of 12 REs (or SCs) in the frequency domain is taken as an example.

Figure 7:
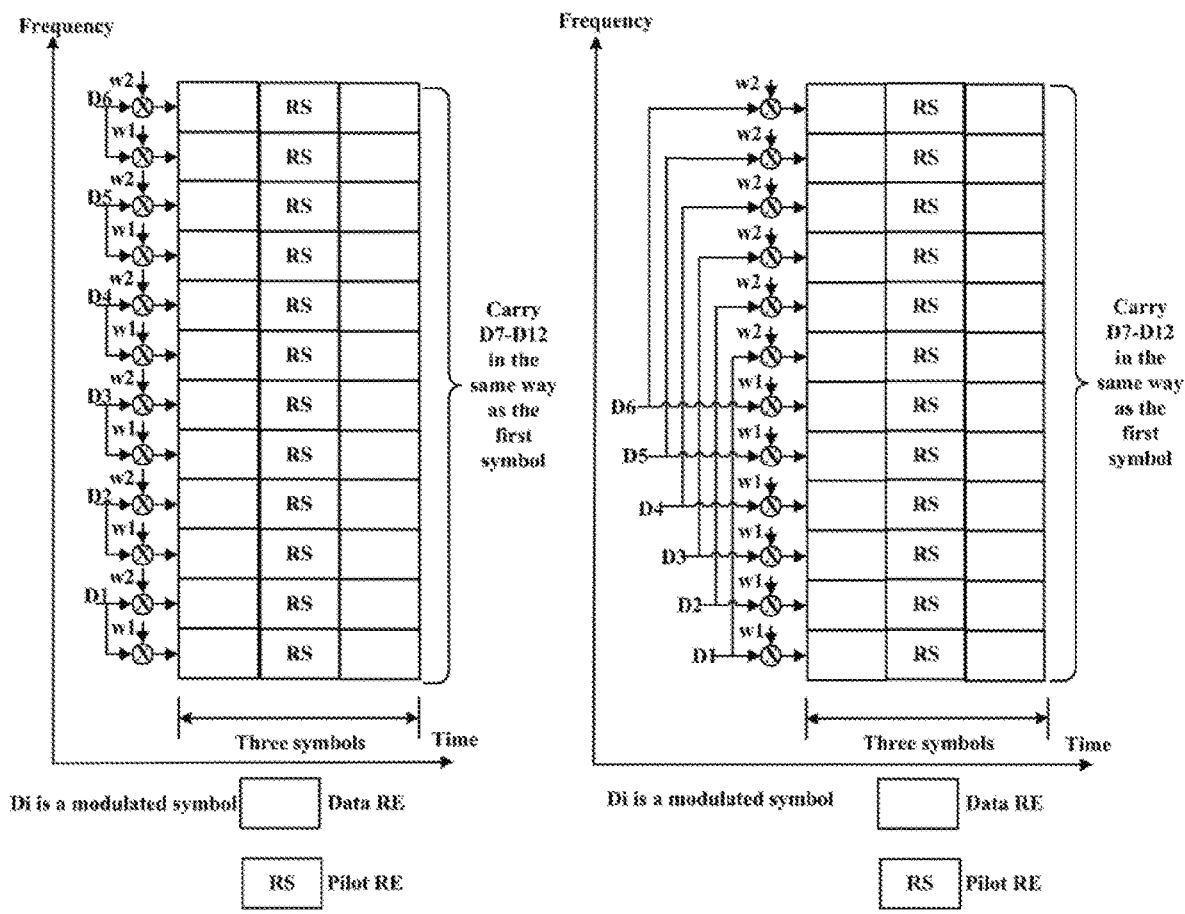
Figure 8:
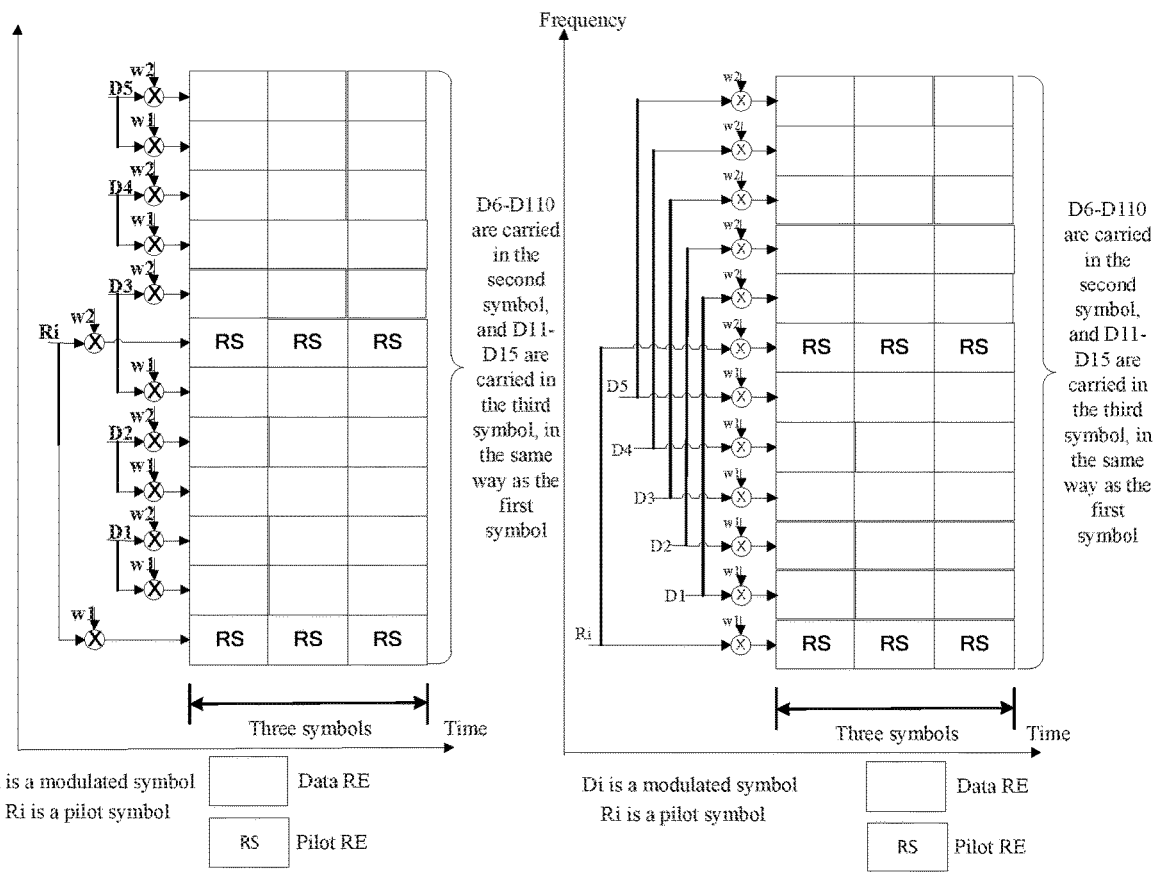

In a first implementation, each symbol is spread using an OCC with a length N=2, and the same spreading in the frequency domain and mapping are performed on each symbol carrying data, as illustrated in FIG. 7 and FIG. 8.

Figure 9:
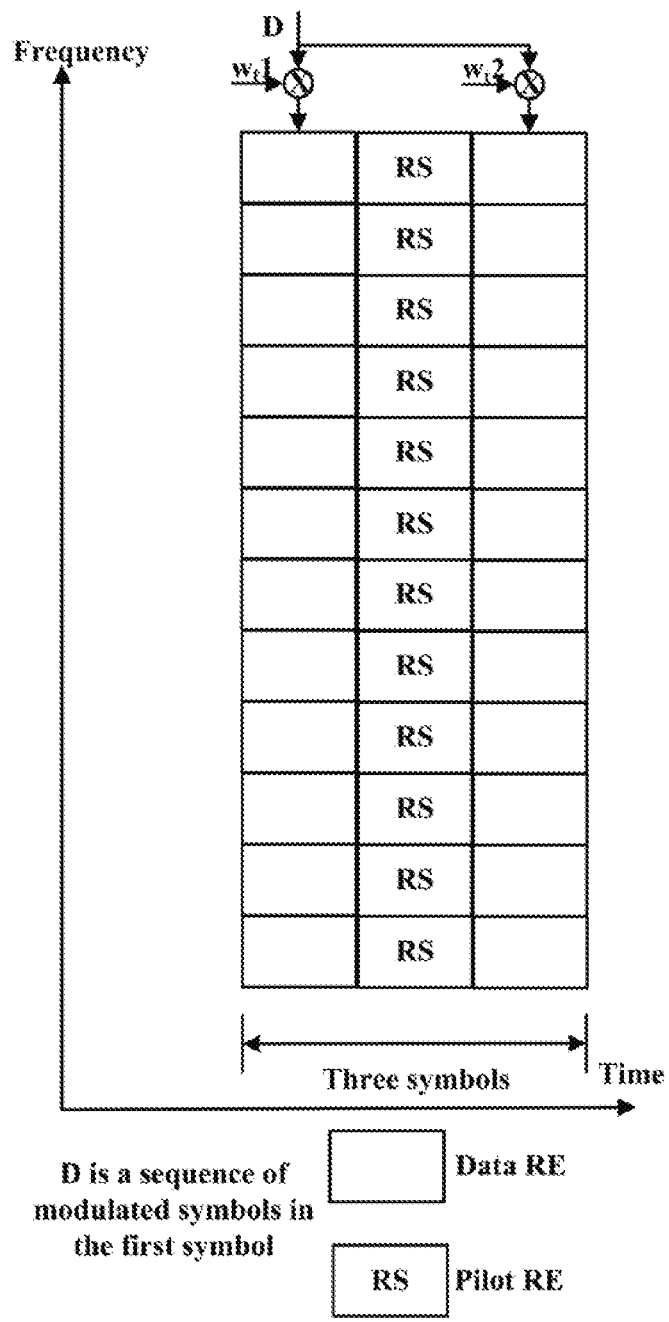
Figure 10:
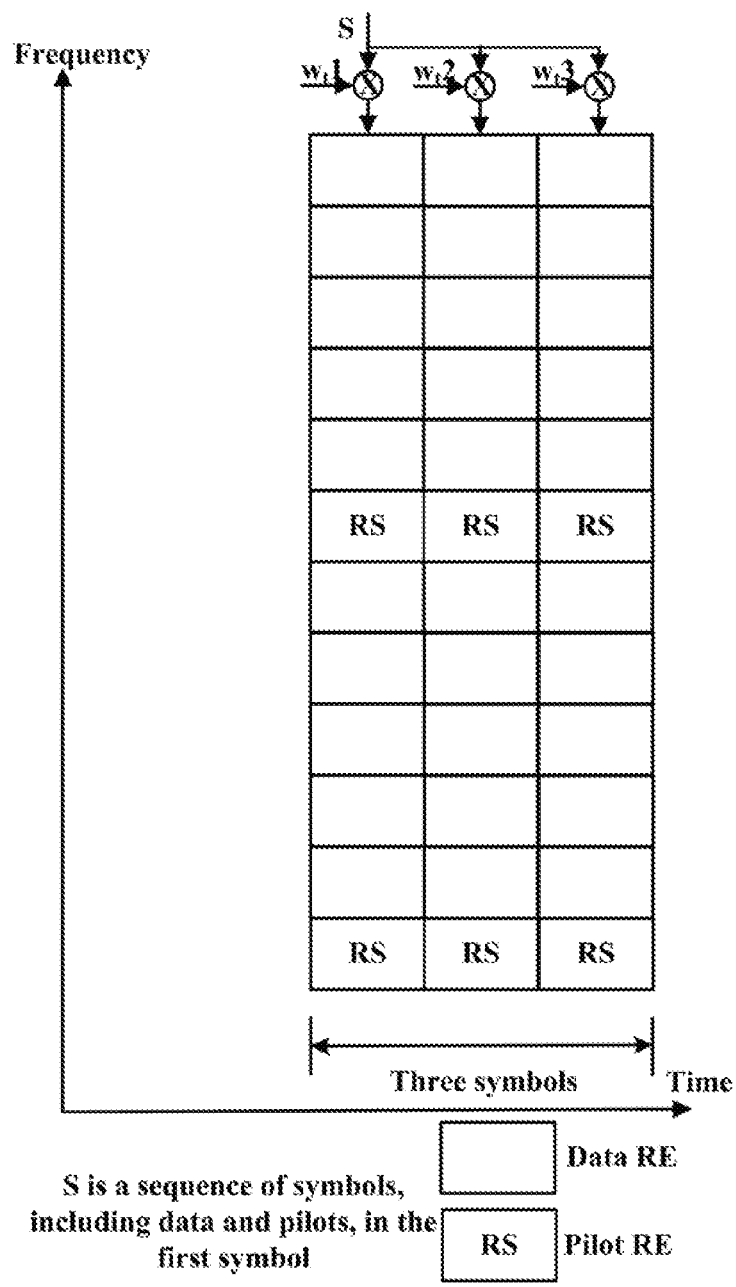

In a second implementation, spreading is performed in the time domain using an OCC with a length M=2 as illustrated in FIG. 9; or spreading is performed in the time domain using an OCC with a length M=3 as illustrated in FIG. 10.

Figure 11:
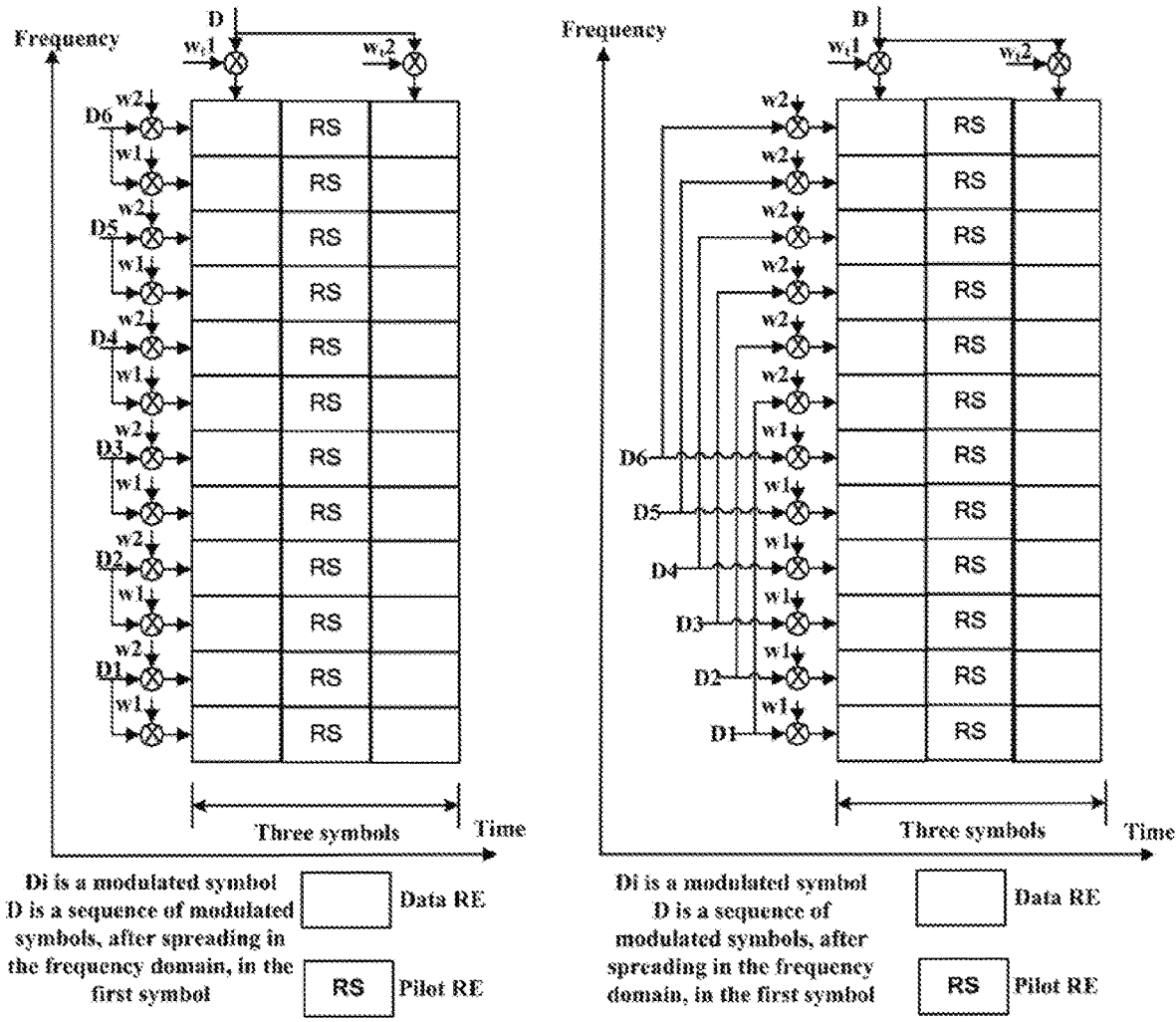
Figure 12:
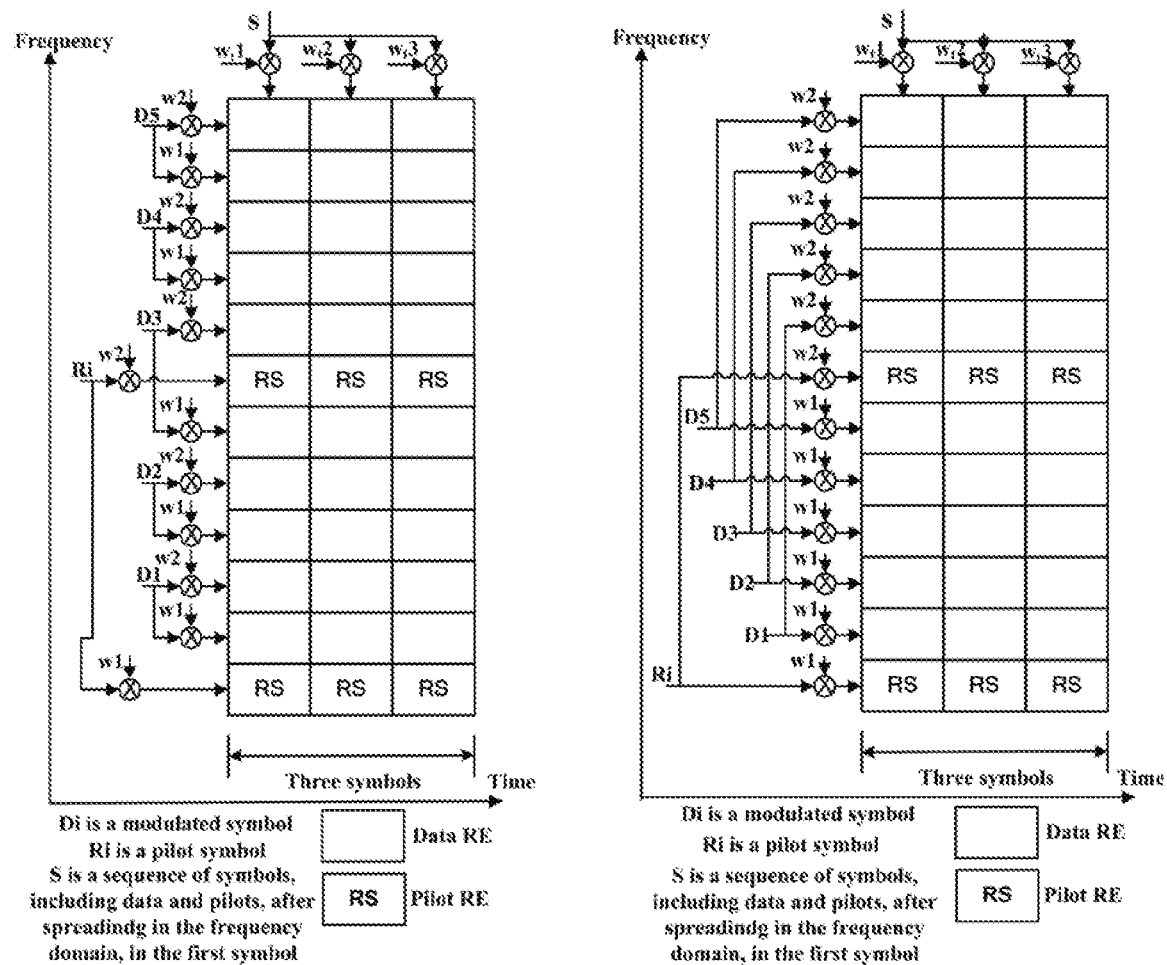

In a third implementation, spreading is performed both in the time domain using an OCC with the length M=2, and in the frequency domain using an OCC with the length N=2; as illustrated in FIG. 11; or spreading is performed both in the time domain using an OCC with the length M=3, and in the frequency domain using an OCC with the length N=2, as illustrated in FIG. 12, where the OCC sequence in the frequency domain may be different from the OCC sequence in the time domain.

In FIG. 5, FIG. 7, FIG. 9, and FIG. 10, for example, all the REs in a symbol are occupied by pilots in the same way as in the LTE, and in FIG. 5, when the uplink control information is transmitted in a current symbol, channel estimation can be performed using pilots in a preceding or succeeding symbol thereof, and at this time, the pilots can be designed in the same way as in a PUCCH of the original LTE system to be cyclically shifted in the frequency domain, where spacing of cyclic shifting, and a length of a pilot satisfy that the quantity of UEs which can be distinguished from each other is at least no less than the quantity of UEs which can be distinguished from each other using data symbols. Spreading can also be performed on the pilots in the time domain using an OCC, and/or in the frequency domain using an OCC in the same way as data.

In FIG. 6, FIG. 8, FIG. 10, and FIG. 12, for example, pilots and data for uplink transmission are transmitted in a symbol in a frequency division mode, that is, they are transmitted in different REs, and the pilots can be designed in the same way as in a PUCCH of the original LTE system to be cyclically shifted in the frequency domain, where the spacing of cyclic shifting, and the length of a pilot satisfy that the quantity of UEs which can be distinguished from each other is at least no less than the quantity of UEs which can be distinguished from each other using data symbols, and spreading can also be performed on the pilots in the time domain using an OCC, and/or in the frequency domain using an OCC in the same way as data.

In the embodiment above, when there are a larger quantity of REs occupied in the frequency domain, they are similarly mapped, and for example, when Z REs with a length of 12 are occupied in the frequency domain, each RE region with the length of 12 can be spread and mapped in the same way as illustrated in FIG. 5, or Z REs with the length of 12 can be jointly spread and mapped at a specific spacing in the same way as an RE region with the length of 12.

Furthermore the spacing between two pilot symbols in the pilot patterns as illustrated in FIG. 6, FIG. 8, FIG. 10, and FIG. 12 above is 6 REs, but can alternatively be adjusted to 2, 3, 4, 12, etc. REs, that is, the density of the pilots in the time domain and/or the frequency domain can be varied, and they can be designed particularly in the same way as described above, so a repeated description thereof will be omitted here.

The length of an OCC can alternatively be another value, e.g., N=3, 4, 5, 6, etc., M=4, 5, etc., and it can be designed particularly in the same way as described above, so a repeated description thereof will be omitted here.

A particular process of transmitting the uplink control information will be introduced below in connection with a particular example thereof.

A particular embodiment of the transmission process is as follows.

For example, in a pilot pattern as illustrated in FIG. 5, where different symbols are occupied separately by pilots and uplink control information, if the uplink control information is transmitted over resources including one symbol in the time domain (i.e., an SC-FDMA symbol, where the same will apply hereinafter, although a repeated description thereof will be omitted), and 24 REs in the frequency domain, and modulated through Quadrature Phase Shift Keying (QPSK), then: without spreading in the frequency domain using an OCC, the total quantity of REs in which uplink data can be transmitted is 24, so the quantity of code bits which can be carried is 24*2=48. If the quantity of bits for original uplink control information is 8, then the 8 bits of information to which check information of CRC (e.g., 8 bits) is added will be channel-encoded and rate-matched to obtain 48 code bits (where there is a code rate of ⅓), the 48 code bits will be QPSK-modulated into 24 modulated symbols, and the modulated symbols will be mapped respectively onto 24 RE positions in the symbol above, and particularly can be mapped one by one in an order of ascending frequencies, or can be mapped one by one in an order of descending frequencies.

With spreading in the frequency domain using an OCC, as illustrated in FIG. 5, N is 2, so the quantity of REs in which different uplink data can be transmitted is 12 (although the total quantity of REs is 24, every two REs carry a spread version of the same original bits, so the quantity of different modulated symbols which can be really carried is only 12), and the quantity of code bits Which can be carried is 1.2*2=24. In this way, the quantity of bits for original uplink control information which can be carried is reduced at the same code rate, or if there are also the same quantity of original bits which are carried, then the code rate will increase.

If the quantity of bits for original uplink control information is 8, then the 8 bits of information to which CRC (e.g., 8 bits) information is added will be channel-encoded and rate-matched to obtain 24 code bits (where there is a code rate of 16/24=⅔), or if the quantity of bits for original uplink control information is 4, then the 4 bits of information to which CRC (e.g., 8 bits) information is added will be channel-encoded and rate-matched to obtain 24 code bits (where there is a code rate of 12/24=½); and the 24 code bits will be QPSK-modulated into 12 modulated symbols, and two modulated symbols into which each modulated symbol is spread using an OCC with the length of 2 will be mapped respectively onto two RE positions in the symbol above, and spread and mapped one by one in a specific order, and particularly can be mapped one by one in an order of ascending frequencies, or can be mapped one by one in an order of descending frequencies.

When the quantity of symbols to be occupied, and/or the size of the frequency domain resources) (the quantity of REs) is varied, the quantity of code bits above varies therewith, and if the code rate is unvaried, then the quantity of bits for original uplink control information which can be carried will also vary therewith.

In another example, in a pilot pattern as illustrated in FIG. 6, where pilot and data are transmitted in the same symbol in a frequency division mode, if uplink control information is transmitted over resources including one symbol in the time domain, and 24 REs in the frequency domain, and modulated through QPSK, then: without spreading in the frequency domain using an OCC, the total quantity of REs in which uplink data can be transmitted is 24−4=20, so the quantity of code bits which can be carried is 20*2=40. If the quantity of bits for original uplink control information is 8, then the 8 bits of information to which check information of CRC (e.g., 8 bits) is added will be channel-encoded and rate-matched to obtain 40 code bits (where there is a code rate of $16/40=2/5$), the 40 code bits will be QPSK-modulated into 20 modulated symbols, and the modulated symbols will be mapped respectively onto 20 RE positions in the symbol above, and particularly can be mapped one by one in an order of ascending frequencies, or can be mapped one by one in an order of descending frequencies.

With spreading in the frequency domain using an OCC, as illustrated in FIG. 6, N is 2, so the quantity of REs in which different uplink data can be transmitted is (24−4)/N=10 (although the total quantity of REs is 20, every two REs carry a spread version of the same original bits, so the quantity of different modulated symbols which can be really carried is only 10), and the quantity of code bits which can be carried is 10*2=20. In this way, the quantity of bits for original uplink control information which can be carried is reduced at the same code rate, or if there are also the same quantity of original bits which are carried, then the code rate will increase.

If the quantity of bits for original uplink control information is 8, then the 8 bits of information to which CRC (e.g., 8 bits) information is added will be channel-encoded and rate-matched to obtain 20 code bits (where there is a code rate of $16/20=4/5$), or if the quantity of bits for original uplink control information is 4, then the 4 bits of information to which CRC (e.g., 8 bits) information is added will be channel-encoded and rate-matched to obtain 20 code bits (where there is a code rate of $12/20=3/5$); and the 20 code bits be QPSK-modulated into 10 modulated symbols, and two modulated symbols into which each modulated symbol is spread using an OCC with the length of 2 will be mapped respectively onto two RE positions in the symbol above, and spread and mapped one by one in a specific order, and particularly can be mapped one by one in an order of ascending frequencies, or can be mapped one by one in an order of descending frequencies.

When the quantity of symbols to be occupied, and/or the size of the frequency domain resource(s) (the quantity of REs) is varied, the quantity of code bits above varies therewith, and if the code rate is unvaried, then the quantity of bits for original uplink control information which can be carried will also vary therewith.

Figure 13:
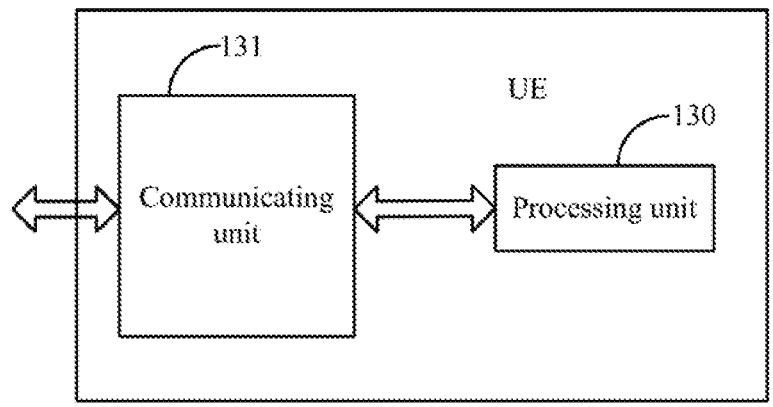
FIG. 13 and FIG. 14 are schematic functionally structural diagrams respectively of UEs according to the embodiments of the invention.

Referring to FIG. 13, a User Equipment (UE) according to an embodiment of the invention includes a processing unit 130 and a communicating unit 131, where: the processing unit 130 is configured to determine resources for transmitting uplink control information, where the resources include the time domain resource(s) and the frequency domain resource(s), where a length of the time domain resource(s) is less than 1 ms; and the communicating unit 131 is configured to transmit the uplink control information over determined resources.

Optionally, of the resources for transmitting the uplink control information, which are determined by the processing unit 130, a size of the frequency domain resource(s) is represented as the quantity of Sub-Carriers (SCs) or the quantity of Resource Elements (REs) or the quantity of Resource Units (RUs), where if the size of the frequency domain resource(s) is represented as the quantity of RUs, then an RU is a predefined resource region occupying X1 symbols in a time domain, and X2 SCs or REs in a frequency domain, where the X2 SCs or REs are consecutive or inconsecutive, and X1 and X2 are predefined or preconfigured, and of the resources for transmitting the uplink control information, which are determined by the processing unit 130, a size of the time domain resource(s) is represented as the quantity of symbols or a length of time.

Optionally the processing unit 130 determines the size of the frequency domain resource(s) as fixedly set A1 SCs or A2 REs or A3 RUs, where A1, A2, and A3 are integers greater than 0, or the processing unit 130 determines the size of the frequency domain resource(s) according to signaling, and determines the position(s) of the frequency domain resource(s) according to pre-definition, or the processing unit 130 determines the position(s) of the frequency domain resource(s) according to signaling.

The processing unit 130 determines a size of the time domain resource(s) as fixedly set B1 symbols or B2 ms, where B1 is an integer greater than 0 and B2 is a fraction less than 1, or the processing unit 130 determines a size of the time domain resource(s) according to signaling, and determines the position(s) of the time domain resource(s) according to pre-definition, or the processing unit 130 determines the position(s) of the time domain resource(s) according to signaling.

Optionally the processing unit 130 determines the resources for transmitting the uplink control information as follows.

The processing unit 130 determines the resources for transmitting the uplink control information according to a downlink (DL) grant, where an indication field in Downlink Control Information (DCI) used by the DL grant indicates one of a plurality of sets of resources preconfigured via higher-layer signaling; or the processing unit 130 determines the resources for transmitting the uplink control information according to an uplink (UL) grant, where a first indication field in DCI used by the UL grant indicates the size and the position(s) of the frequency domain resource(s), and a second indication field in the DCI indicates at least the size of the time domain resource(s); or the processing unit 130 determines the resources for transmitting the uplink control information according to higher-layer signaling, where at least one set of resources is configured by the higher-layer signaling, and when a plurality of sets of resources are configured, the processing unit 130 selects one of the sets of resources.

Optionally when the processing unit 130 determines the resources for transmitting the uplink control information according to the UL grant, where the first indication field in the DCI used by the UL grant indicates the size and the position(s) of the frequency domain resource(s), and the second indication field in the DCI indicates at least the size of the time domain resource(s), the second indication field further indicates the position(s) of the time domain resource(s), or the position(s) of the time domain resource(s) is (or are) predefined.

Optionally when the processing unit 130 determines the resources for transmitting the uplink control information according to the DL grant, where the indication field in the DCI used by the DL grant indicates one of the plurality of sets of resources preconfigured via higher-layer signaling, or the processing unit 130 determines the resources for transmitting the uplink control information according to the higher-layer signaling, where at least one set of resources is configured by the higher-layer signaling, and when a plurality of sets of resources are configured, the processing unit 130 selects one of the sets of resources, then the sets of resources are configured as follows.

Each set of resources includes the size and the position(s) of the frequency domain resource(s), and the size of the time domain resource(s), where sizes of the frequency domain resource(s) in different sets of resources are the same or different, and/or sizes of the time domain resource(s) in different sets of resources are the same or different.

Or the size of the frequency domain resource(s) is a fixed value negotiated between a UE side and a network side, and each set of resources includes the position(s) of the frequency domain resource(s) and the size of the time domain resource(s), where sizes of the time domain resource(s) in different sets of resources are the same or different.

Or the size of the time domain resource(s) is a fixed value negotiated between a UE side and a network side, and each set of resources includes the size and the position(s) of the frequency domain resource(s), where sizes of the frequency domain resource(s) in different sets of resources are the same or different.

Or the size of the time domain resource(s) is a fixed value negotiated between a UE side and a network side, the size of the frequency domain resource(s) is a fixed value negotiated between the UE side and the network side, and each set of resources includes the position(s) of the frequency domain resource(s).

Optionally, each set of resources further includes the position(s) of the time domain resource(s), or the position(s) of the time domain resource(s) is (or are) predefined.

Optionally when the processing unit 130 determines the resources for transmitting the uplink control information according to the higher-layer signaling, where at least one set of resources is configured by the higher-layer signaling, and when a plurality of sets of resources are configured, the processing unit 130 selects one of the sets of resources as follows: the processing unit 130 determines a set of resources to be selected, according to the total quantity of bits of uplink control information to be fed back, and the maximum quantity of bits, which can be carried in each of the sets of resources according to a specific code rate; or when there are different sizes of the time domain resource(s) in different sets of resources, the processing unit 130 determines a set of resources to be selected, according to sizes of the time domain resource(s) in respective sets of resources; or the processing unit 130 determines a set of resources to be selected, according to the quantity of symbols in each of the sets of resources.

Optionally if the position(s) of the time domain resource(s) is (or are) predefined, then the processing unit 130 will determine a start position of the time domain resource(s), as follows.

If the uplink control information is Acknowledgement/Non-Acknowledgement (ACK/NACK) feedback information, then the processing unit 130 will operate as follows: the processing unit 130 determines the start position of the time domain resource(s) as the first symbol in a period of time with an index of n+k, where n is an index of a period of time in which downlink data requiring ACK/NACK feedback are transmitted, k is a predetermined value; or the processing unit 130 determines the start position of the time domain resource(s) as the first symbol in a k-th pre-allocated period of time for uplink transmission, after a pre-allocated period of time for downlink transmission, in which downlink data requiring ACK/NACK feedback are transmitted, where k is a predetermined value; or the processing unit 130 determines the start position of the time domain resource(s) as the first symbol satisfying a preset timing relationship, where said symbol is a symbol in a period of time for uplink transmission; or the processing unit 130 determines the start position of the time domain resource(s) as the first symbol in a period of time for uplink transmission satisfying a preset timing relationship, where whether the timing relationship is satisfied is determined by symbol spacing between the last symbol for downlink data transmission, and the first symbol in the period of time for uplink transmission, where: the timing relationship as referred to is particularly embodied as a processing delay, where the processing delay includes time for parsing and processing downlink data, and time for generating ACK/NACK feedback information corresponding to the downlink data; and with reference to an end of a transmission of downlink data, ACK/NACK feedback information thereof will be transmitted in the uplink symbol(s) that is (or are) not earlier than an uplink symbol satisfying the processing delay.

If the uplink control information is periodic Channel State Information (CSI) feedback information, then the processing unit 130 will operate as follows: the processing unit 130 determines a position of a start symbol of the time domain resource(s), according to a preconfigured CSI feedback periodicity, where the periodicity is particularly embodied as Y1 symbols, and Y1 is a positive integer; or the processing unit 130 determines a predetermined uplink symbol position in a sub-frame, in which CSI is transmitted, corresponding to a preconfigured CSI feedback periodicity as a position of a start symbol of the time domain resource(s), according to the CSI feedback periodicity, where the CSI feedback periodicity is particularly embodied as Y2 sub-frames, and Y2 is a positive integer.

Optionally the communicating unit 131 configured to transmit the uplink control information over the determined resources by: transmitting the uplink control information over the determined resources without spreading; or transmitting the uplink control information over the determined resources with spreading.

Optionally the communicating unit 131 is configured to transmit the uplink control information over the determined resources without spreading as follows: the communicating unit 131 determines the quantity of code bits according to the quantity of REs, in which data can be transmitted, over the determined resources, and a modulation and coding scheme, and further performs channel coding and rate matching for the uplink control information based upon the quantity of code bits to obtain corresponding modulated symbols; and the communicating unit 131 maps obtained modulated symbols in a specific order onto the determined resources for transmission.

Optionally the communicating unit 131 is configured to transmit the uplink control information over the determined resources with spreading as follows: the communicating unit 131 determines the quantity of code bits according to the quantity of REs, in which data can be transmitted, over the determined resources, a length of a spreading sequence and a modulation and coding scheme, and further performs channel coding and rate matching for the uplink control information based upon the quantity of code bits to obtain corresponding modulated symbols; and the communicating unit 131 multiples each of obtained modulated symbols with an orthogonal sequence with a length of N to obtain spread modulated symbols with a length of N, and furthers maps the spread modulated symbols with the length of N onto an RE group in a symbol the determined resources for transmission, where the RE group includes N REs, and N is a length of the orthogonal sequence.

Optionally when there are a plurality of symbols in the time domain resource(s), the communicating unit 131 is further configured to operate as follows: the communicating unit 131 spreads each symbol in the frequency domain using an orthogonal sequence with a length of N; or the communicating unit 131 spreads each symbol in the time domain using an orthogonal sequence with a length of B, where B is the quantity of symbols for transmitting data, among the quantity of symbols in the time domain resource(s); or the communicating unit 131 spreads each symbol in the frequency domain using an orthogonal sequence with a length of N, and the communicating unit 131 spreads each symbol in the time domain using an orthogonal sequence with a length of B, where B is the quantity of symbols for transmitting data, among the quantity of symbols in the time domain resource(s).

Optionally the communicating unit 131 is further configured to: carry a specific sequence while transmitting the uplink control information, where the specific sequence is related to an identifier (ID) of the apparatus, and is at least used by another network element to identify the apparatus and to perform interference measurement on the apparatus.

Figure 14:
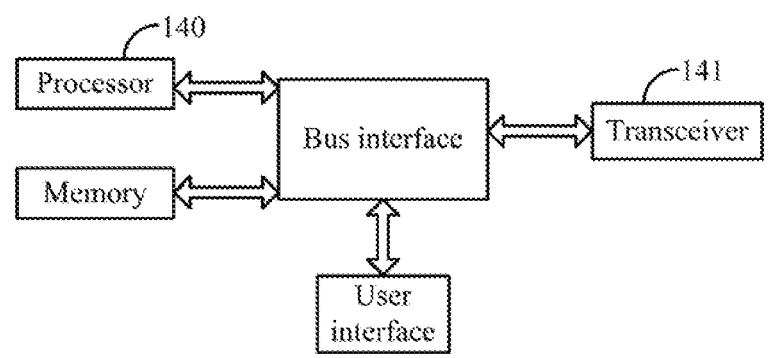

Referring to FIG. 14, a User Equipment (UE) according to an embodiment of the invention includes a processor 140 and a transceiver 141, where: the processor 140 is configured to read programs in a memory to: determine resources for transmitting uplink control information, where the resources include the time domain resource(s) and the frequency domain resource(s), where a length of the time domain resource(s) is less than 1 ms; and the transceiver 141 is configured to transmit the uplink control information over determined resources under the control of the processor.

Optionally, of the resources for transmitting the uplink control information, which are determined by the processor 140, a size of the frequency domain resource(s) is represented as the quantity of Sub-Carriers (SCs) or the quantity of Resource Elements (REs) or the quantity of Resource Units (RUs), where if the size of the frequency domain resource(s) is represented as the quantity of RUs, then an RU is a predefined resource region occupying X1 symbols in a time domain, and X2 SCs or REs in a frequency domain, where the X2. SCs or REs are consecutive or inconsecutive, and X1 and X2 are predefined or preconfigured; and of the resources for transmitting the uplink control information, which are determined by the processor 140, a size of the time domain resource(s) is represented as the quantity of symbols or a length of time.

Optionally the processor 140 determines the size of the frequency domain resource(s) as fixedly set A1 SCs or A2 REs or A3 RUs, where A1, A2, and A3 are integers greater than 0, or the processor 140 determines the size of the frequency domain resource(s) according to signaling, and determines the position(s) of the frequency domain resource(s) according to pre-definition, or the processor 140 determines the position(s) of the frequency domain resource(s) according to signaling.

The processor 140 determines the size of the time domain resource(s) as fixedly set B1 symbols or B2 ms, where B1 is an integer greater than 0, and B2 is a fraction less than 1, or the processor 140 determines the size of the time domain resource(s) according to signaling, and determines the position(s) of the time domain resource(s) according to pre-definition, or the processor 140 determines the position(s) of the time domain resource(s) according to signaling.

Optionally the processor 140 determines the resources for transmitting the uplink control information as follows: the processor 140 determines the resources for transmitting the uplink control information according to a downlink (DL) grant, where an indication field in Downlink Control Information (DCI) used by the DL grant indicates one of a plurality of sets of resources preconfigured via higher-layer signaling; or the processor 140 determines the resources for transmitting the uplink control information according to an uplink (UL) grant, where a first indication field in DCI used by the UL grant indicates the size and the position(s) of the frequency domain resource(s), and a second indication field in the DCI indicates at least the size of the time domain resource(s); or the processor 140 determines the resources for transmitting the uplink control information according to higher-layer signaling, where at least one set of resources is configured by the higher-layer signaling, and when a plurality of sets of resources are configured, the processor 140 selects one of the sets of resources.

Optionally when the processor 140 determines the resources for transmitting the uplink control information according to the UL grant, where the first indication field in the DCI used by the UL grant indicates the size and the position(s) of the frequency domain resource(s), and the second indication field in the DCI indicates at least the size of the time domain resource(s), the second indication field further indicates the position(s) of the time domain resource(s), or the position(s) of the time domain resource(s) is (or are) predefined.

Optionally when the processor 140 determines the resources for transmitting the uplink control information according to the DL grant, where the indication field in the DCI used by the DL grant indicates one of the plurality of sets of resources preconfigured via higher-layer signaling; or the processor 140 determines the resources for transmitting uplink control information according to the higher-layer signaling, where at least one set of resources is configured by the higher-layer signaling, and when a plurality of sets of resources are configured, the processor 140 selects one of the sets of resources, then the sets of resources are configured as follows.

Each set of resources includes the size and the position(s) of the frequency domain resource, and the size of the time domain resource(s), where sizes of the frequency domain resource(s) in different sets of resources are the same or different, and/or sizes of the time domain resource(s) in different sets of resources are the same or different; or the size of the frequency domain resources)is a fixed value negotiated between a UE side and a network side, and each set of resources includes the position(s) of the frequency domain resource(s) and the size of the time domain resource(s), where sizes of the time domain resource, in different sets of resources are the same or different; or the size of the time domain resources) is a fixed value negotiated between a UE side and a network side, and each set of resources includes the size and the position(s) of the frequency domain resource(s), where sizes of the frequency domain resource(s) in different sets of resources are the same or different; or the size of the time domain resource(s) is a fixed value negotiated between a UE side and a network side, the size of the frequency domain resource(s) is a fixed value negotiated between the UE side and the network side, and each set of resources includes the position(s) of the frequency domain resource(s).

Optionally each set of resources further includes the position(s) of the time domain resource(s), or the position(s) of the time domain resource(s) is (or are) predefined.

Optionally when the processor 140 determines the resources for transmitting the uplink control information according to the higher-layer signaling, Where at least one set of resources is configured by the higher-layer signaling, and when a plurality of sets of resources are configured, the processor 140 selects one of the sets of resources, as follows: the processor 140 determines a set of resources to be selected, according to the total quantity of bits of uplink control information to be fed back, and the maximum quantity of bits, which can be carried in each of the sets of resources according to a specific code rate; or when there are different sizes of the time domain resource(s) in different sets of resources, the processor 140 determines a set of resources to be selected, according to sizes of the time domain resource(s) in respective sets of resources; or the processor 140 determines a set of resources to be selected, according to the quantity of symbols in each of the sets of resources.

Optionally if the position(s) of the time domain resource(s) is (or are) predefined, then the processor 140 will determine a start position of the time domain resource(s), as follows.

If the uplink control information is Acknowledgement/Non-Acknowledgement (ACK/NACK) feedback information, then the processor 140 will operate as follows: the processor 140 determines the start position of the time domain resource(s) as the first symbol in a period of time with an index of n+k, where n is an index of a period of time in which downlink data requiring ACK/NACK feedback are transmitted, k is a predetermined value; or the processor 140 determines the start position of the time domain resource(s) as the first symbol in a k-th pre-allocated period of time for uplink transmission, after a pre-allocated period of time for downlink transmission, in which downlink data requiring ACK/NACK feedback are transmitted, where k is a predetermined value; or the processor 140 determines the start position of the time domain resource(s) as the first symbol satisfying a preset timing relationship, where said symbol is a symbol in a period of time for uplink transmission; or the processor 140 determines the start position of the time domain resource(s) as the first symbol in a period of time for uplink transmission satisfying a preset timing relationship, where whether the timing relationship is satisfied is determined by symbol spacing between the last symbol for downlink data transmission, and the first symbol in the period of time for uplink transmission, where: the timing relationship as referred to is particularly embodied as a processing delay, where the processing delay includes time for parsing and processing downlink data, and time for generating ACK/NACK feedback information corresponding to the downlink data; and with reference to an end of a transmission of downlink data, ACK/NACK feedback information thereof will be transmitted in the uplink symbol(s) that is (or are) not earlier than an uplink symbol satisfying the processing delay.

If the uplink control information is periodic Channel State Information (CSI) feedback information, then the processor 140 will operate as follows: the processor 140 determines a position of a start symbol of the time domain resource(s) according to a preconfigured CSI feedback periodicity, where the periodicity is particularly embodied as Y1 symbols, and Y1 is a positive integer; or the processor 140 determines a predetermined uplink symbol position in a sub-frame, in which CSI is transmitted, corresponding to a preconfigured CSI feedback periodicity as a position of a start symbol of the time domain resource(s), according to the CSI feedback periodicity, where the CSI feedback periodicity is particularly embodied as Y2 sub-frames, and Y2 is a positive integer.

Optionally the transceiver 141 configured to transmit the uplink control information over the determined resources by: transmitting the uplink control information over the determined resources without spreading; or transmitting the uplink control information over the determined resources with spreading.

Optionally the transceiver 141 is configured to transmit the uplink control information over the determined resources without spreading as follows: the transceiver 141 determines the quantity of code bits according to the quantity of REs, in which data can be transmitted, over the determined resources, and a modulation and coding scheme, and further performs channel coding and rate matching for the uplink control information based upon the quantity of code bits to obtain corresponding modulated symbols; and the transceiver 141 maps obtained modulated symbols in a specific order onto the determined resources for transmission.

Optionally the transceiver 141 is configured to transmit the uplink control information over the determined resources with spreading as follows: the transceiver 141 determines the quantity of code bits according to the quantity of REs, in which data can be transmitted, over the determined resources, a length of a spreading sequence and a modulation and coding scheme, and further performs channel coding and rate matching for the uplink control information based upon the quantity of code bits to obtain corresponding modulated symbols; and the transceiver 141 multiples each of obtained modulated symbols with an orthogonal sequence with a length of N to obtain spread modulated symbols with a length of N, and furthers maps the spread modulated symbols with the length of N onto an RE group in a symbol in the determined resources for transmission, where the RE group includes N REs, and N is a length of the orthogonal sequence.

Optionally when there are a plurality of symbols in determined time domain resource(s), the transceiver 141 is further configured to: spread each symbol in the frequency domain using an orthogonal sequence with a length of N; or spread each symbol in the time domain using an orthogonal sequence with a length of B, where B is the quantity of symbols for transmitting data, among the quantity of symbols in the time domain resource(s); or spread each symbol in the frequency domain using an orthogonal sequence with a length of N, and spread each symbol in the time domain using an orthogonal sequence with a length of B, where B is the quantity of symbols for transmitting data, among the quantity of symbols in the time domain resource(s).

Optionally the transceiver 141 is further configured to: carry a specific sequence While transmitting the uplink control information, where the specific sequence is related to an identifier (ID) of the apparatus, and is at least used by another network element to identify the apparatus and to perform interference measurement on the apparatus.

Here in FIG. 14, the bus architecture can include any quantity of interconnecting buses and bridges to particularly link together various circuits including one or more processors represented by the processor 140, and one or more memories represented by the memory. The bus architecture can further link together various other circuits, e.g., a peripheral device, a manostat, a power management circuit, etc., all of which are well known in the art, so a further description thereof will be omitted in this context. The bus interface serves as an interface. The transceiver 141 can be a plurality of elements, e.g., a transmitter and a receiver, which are units for communication with various other devices over a transmission medium. For different user equipment, the user interface can also be an interface via which a device(s) is connected externally and/or internally, where the connected device(s) includes but will not be limited to a keypad, a display, a loudspeaker, a microphone, a joystick, etc.

The processor 140 is responsible for managing the bus architecture and performing normal processes, and the memory can store data for use by the processor 140 in performing operations.

In summary, in the embodiments of the invention, the UE determines resources for transmitting uplink control information, where the resources include the time domain resource(s) and the frequency domain resource(s), where the length of the time domain resource(s) is less than 1 ms, and then the LTE transmits uplink control information over the determined resources, so that there is provided a solution to transmitting uplink control information in a shortened TTI to thereby support normal feedback of uplink control information so as to guarantee the performance of the system.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting uplink control information, the method comprising:
   determining, by a User Equipment (UE), resources for transmitting the uplink control information, wherein the resources comprise a time domain resource and a frequency domain resource, wherein a length of the time domain resource is less than 1 ms; and
   transmitting, by the UE, the uplink control information over determined resources;
   wherein determining, by the UE, the resources for transmitting the uplink control information comprises:
   determining, by the UE, the resources for transmitting the uplink control information according to a downlink (DL) grant, wherein an indication field in Downlink Control Information (DCI) used by the DL grant indicates one of a plurality of sets of resources preconfigured via higher-layer signaling; or
   determining, by the UE, the resources for transmitting the uplink control information according to an uplink (UL) grant, wherein a first indication field in DCI used by the UL grant indicates a size and a position of the frequency domain resource, and a second indication field in the DCI indicates at least a size of the time domain resource; or
   determining, by the UE, the resources for transmitting the uplink control information according to higher-layer signaling, wherein at least one set of resources is configured by the higher-layer signaling, and when a plurality of sets of resources are configured, the UE selects one of the sets of resources;
   wherein the sets of resources are configured as follows:
   each set of resources comprises the size and the position of the frequency domain resource, and the size of the time domain resource; wherein sizes of the frequency domain resource in different sets of resources are same or different, and/or sizes of the time domain resource in different sets of resources are same or different or
   the size of the frequency domain resource is a fixed value negotiated between a UE side and a network side, and each set of resources comprises the position of the frequency domain resource and the size of the time domain resource, wherein sizes of the time domain resource in different sets of resources are same or different or
   the size of the time domain resource is a fixed value negotiated between a UE side and a network side, and each set of resources comprises the size and the position of the frequency domain resource, wherein sizes of the frequency domain resource in different sets of resources are same or different; or
   the size of the time domain resource is a fixed value negotiated between a UE side and a network side, the size of the frequency domain resource is a fixed value negotiated between the UE side and the network side, and each set of resources comprises the position of the frequency domain resource.

2. The method according to claim 1, wherein among the resources for transmitting the uplink control information, which are determined by the UE, a size of the frequency domain resource is represented as a quantity of Sub-Carriers (SCs) or a quantity of Resource Elements (REs) or a quantity of Resource Units (RUs); wherein if the size of the frequency domain resource is represented as the quantity of RUs, then an RU is a predefined resource region occupying X1 symbols in a time domain and X2 SCs or REs in a frequency domain; wherein the X2 SCs or REs are consecutive or inconsecutive, X1 and X2 are predefined or preconfigured, and both X1 and X2 are integers greater than 0; and among the resources for transmitting the uplink control information, which are determined by the UE, a size of the time domain resource is represented as a quantity of symbols or a length of time;

and/or, wherein the UE determines a size of the frequency domain resource as fixedly set A1 SCs or A2 REs or A3 RUs, wherein A1, A2, and A3 are integers greater than 0, or the UE determines a size of the frequency domain resource according to signaling; and the UE determines a position of the frequency domain resource according to pre-definition, or the UE determines a position of the frequency domain resource according to signaling; and the UE determines a size of the time domain resource as fixedly set B1 symbols or B2 ms, wherein B1 is an integer greater than 0 and B2 is a fraction less than 1, or the UE determines a size of the time domain resource according to signaling; and the UE determines a position of the time domain resource according to pre-definition, or the UE determines a position of the time domain resource according to signaling.

3. The method according to claim 1, wherein the second indication field further indicates a position of the time domain resource; or a position of the time domain resource is predefined.

4. The method according to claim 1, wherein each set of resources further comprises the position of the time domain resource or the position of the time domain resource is predefined.

5. The method according to claim 1, wherein selecting, by the UE, one of the sets of resources comprises:

determining, by the UE, a set of resources to be selected, according to a total quantity of bits of uplink control information to be fed back, and a maximum quantity of bits, which can be carried in each of the sets of resources according to a specific code rate; or when there are different sizes of the time domain resource in different sets of resources, determining, by the UE, a set of resources to be selected, according to sizes of the time domain resource in respective sets of resources; or determining, by the UE, a set of resources to be selected, according to a quantity of symbols in each of the sets of resources.

6. The method according to claim 1, wherein if a position of the time domain resource is predefined, and the uplink control information is Acknowledgement/Non-Acknowledgement (ACK/NACK) feedback information, then:

the UE determines a start position of the time domain resource as a first symbol in a period of time with an index of n+k, wherein n is an index of a period of time in which downlink data requiring ACK/NACK feedback are transmitted, k is a predetermined value, and n and k are integers greater than or equal to 0; or the UE determines a start position of the time domain resource as a first symbol in a k-th pre-allocated period of time for uplink transmission, after a pre-allocated period of time for downlink transmission in which downlink data requiring ACK/NACK feedback are transmitted, wherein k is a predetermined value, and k is an integer greater than or equal to 0; or the UE determines a start position of the time domain resource as a first symbol satisfying a preset timing relationship, wherein said symbol is a symbol in a period of time for uplink transmission; or the UE determines a start position of the time domain resource as a first symbol in a period of time for uplink transmission satisfying a preset timing relationship, wherein whether the timing relationship is satisfied is determined by symbol spacing between a last symbol for downlink data transmission, and the first symbol in the period of time for uplink transmission, wherein the timing relationship is a processing delay, and the processing delay comprises time for parsing and processing downlink data, and time for generating ACK/NACK feedback information corresponding to the downlink data, wherein with reference to an end of a transmission of downlink data, ACK/NACK feedback information thereof will be transmitted in an uplink symbol that is not earlier than an uplink symbol satisfying the processing delay; and if a position of the time domain resource is predefined, and the uplink control information is periodic Channel State Information (CSI) feedback information, then the UE operates as follows:

the UE determines a position of a start symbol of the time domain resource according to a preconfigured CSI feedback periodicity, wherein the periodicity is represented as Y1 symbols, and Y1 is a positive integer; or the UE determines a predetermined uplink symbol position in a sub-frame, in which CSI is transmitted, corresponding to a preconfigured CSI feedback periodicity as a position of a start symbol of the time domain resource, according to the CSI feedback periodicity, wherein the CSI feedback periodicity is represented as Y2 sub-frames, and Y2 is a positive integer.

7. The method according to claim 1, wherein the transmitting, by the UE, the uplink control information over the determined resources comprises:

transmitting, by the UE, the uplink control information over the determined resources without spreading; or transmitting, by the UE, the uplink control information over the determined resources with spreading.

8. The method according to claim 7, wherein transmitting, by the UE, the uplink control information over the determined resources without spreading comprises:

determining a quantity of code bits according to a quantity of REs, in which data are transmitted, over the determined resources, and a modulation and coding scheme, and performing channel coding and rate matching for the uplink control information based upon the quantity of code bits to obtain corresponding modulated symbols; and mapping the modulated symbols obtained in a specific order onto the determined resources for transmission;

wherein transmitting, by the UE, the uplink control information over the determined resources with spreading comprises:

determining a quantity of code bits according to a quantity of REs, in which data are transmitted, over the determined resources, a length of a spreading sequence and a modulation and coding scheme, and performing channel coding and rate matching for the uplink control information based upon the quantity of code bits to obtain corresponding modulated symbols; and multiplying each of the modulated symbols obtained with an orthogonal sequence with a length of N to obtain spread modulated symbols with a length of N, and mapping the spread modulated symbols with the length of N onto an RE group in a symbol in the determined resources for transmission, wherein the RE group comprises N REs, and N is a length of the orthogonal sequence.

9. The method according to claim 8, wherein when there are a plurality of symbols in the time domain resource determined by the UE and the uplink control information is transmitted over the determined resources with spreading, the method further comprises:

spreading, by the UE, each symbol in a frequency domain using an orthogonal sequence with a length of N; or spreading, by the UE, each symbol in a time domain using an orthogonal sequence with a length of B, wherein B is a quantity of symbols for transmitting data, among a quantity of symbols in the time domain resource, and both N and B are integers greater than or equal to 1; or spreading, by the UE, each symbol in a frequency domain using an orthogonal sequence with a length of N, and spreading, by the UE, each symbol in a time domain using an orthogonal sequence with a length of B, wherein B is a quantity of symbols for transmitting data, among a quantity of symbols in the time domain resource, and both N and B are integers greater than or equal to 1.

10. An apparatus for transmitting uplink control information, the apparatus comprising at least one processor and a memory; wherein the memory is configured to store computer readable program codes, and the at least one processor is configured to execute the computer readable program codes to:

determine resources for transmitting the uplink control information, wherein the resources comprise a time domain resource and a frequency domain resource, wherein a length of the time domain resource is less than 1 ms; and transmit the uplink control information over determined resources;

wherein the at least one processor is further configured to execute the computer readable program codes to:

determine the resources for transmitting the uplink control information according to a downlink (DL) grant, wherein an indication field in Downlink Control Information (DCI) used by the DL grant indicates one of a plurality of sets of resources preconfigured via higher-layer signaling; or determine the resources for transmitting the uplink control information according to an uplink (UL) grant, wherein a first indication field in DCI used by the UL grant indicates a size and a position of the frequency domain resource, and a second indication field in the DCI indicates at least a size of the time domain resource; or determine the resources for transmitting the uplink control information according to higher-layer signaling, wherein at least one set of resources is configured by the higher-layer signaling, and when a plurality of sets of resources are configured, the processing unit selects one of the sets of resources;

wherein the sets of resources are configured as follows:

each set of resources comprises the size and the position of the frequency domain resource, and the size of the time domain resource; wherein sizes of the frequency domain resource in different sets of resources are same or different, and/or sizes of the time domain resource in different sets of resources are same or different or the size of the frequency domain resource is a fixed value negotiated between a UE side and a network side, and each set of resources comprises the position of the frequency domain resource and the size of the time domain resource, wherein sizes of the time domain resource in different sets of resources are same or different or the size of the time domain resource is a fixed value negotiated between a UE side and a network side, and each set of resources comprises the size and the position of the frequency domain resource, wherein sizes of the frequency domain resource in different sets of resources are the same or different or the size of the time domain resource is a fixed value negotiated between a UE side and a network side, the size of the frequency domain resource is a fixed value negotiated between the UE side and the network side, and each set of resources comprises the position of the frequency domain resource.

11. The apparatus according to claim 10, wherein among the resources for transmitting the uplink control information, which are determined by the at least one processor, a size of the frequency domain resource is represented as a quantity of Sub-Carriers (SCs) or a quantity of Resource Elements (REs) or a quantity of Resource Units (RUs); wherein if the size of the frequency domain resource is represented as the quantity of RUs, then an RU is a predefined resource region occupying X1 symbols in a time domain and X2 SCs or REs in a frequency domain; wherein the X2 SCs or REs are consecutive or inconsecutive, X1 and X2 are predefined or preconfigured, and both X1 and X2 are integers greater than 0; and among the resources for transmitting the uplink control information, which are determined by the at least one processor, a size of the time domain resource is represented as a quantity of symbols or a length of time;

and/or, wherein the at least one processor determines a size of the frequency domain resource as fixedly set A1 SCs or A2 REs or A3 RUs, wherein A1, A2, and A3 are integers greater than 0, or the at least one processor determines a size of the frequency domain resource according to signaling; and the at least one processor determines a position of the frequency domain resource according to pre-definition, or the at least one processor determines a position of the frequency domain resource according to signaling; and the at least one processor determines a size of the time domain resource as fixedly set B1 symbols or B2 ms, wherein B1 is an integer greater than 0 and B2 is a fraction less than 1, or the at least one processor determines a size of the time domain resource according to signaling; and the at least one processor determines a position of the time domain resource according to pre-definition, or the at least one processor determines a position of the time domain resource according to signaling.

12. The apparatus according to claim 10, wherein the second indication field further indicates a position of the time domain resource, or
a position of the time domain resource is predefined.

13. The apparatus according to claim 10, wherein each set of resources further comprises the position of the time domain resource or the position of the time domain resource is predefined.

14. The apparatus according to claim 10, wherein the at least one processor is further configured to execute the computer readable program codes to:
determine a set of resources to be selected, according to a total quantity of bits of uplink control information to be fed back, and a maximum quantity of bits, which can be carried in each of the sets of resources according to a specific code rate; or
when there are different sizes of the time domain resource in different sets of resources, determine a set of resources to be selected, according to sizes of the time domain resource in respective sets of resources; or
determine a set of resources to be selected, according to a quantity of symbols in each of the sets of resources.

15. The apparatus according to claim 10, wherein if a position of the time domain resource is predefined, and the uplink control information is Acknowledgement/Non-Acknowledgement (ACK/NACK) feedback information, then:
the at least one processor is further configured to execute the computer readable program codes to: determine a start position of the time domain resource as a first symbol in a period of time with an index of n+k, wherein n is an index of a period of time in which downlink data requiring ACK/NACK feedback are transmitted, k is a predetermined value, and n and k are integers greater than or equal to 0; or determine a start position of the time domain resource as a first symbol in a k-th pre-allocated period of time for uplink transmission, after a pre-allocated period of time for downlink transmission in which downlink data requiring ACK/NACK feedback are transmitted, wherein k is a predetermined value, and k is an integer greater than or equal to 0; or determine a start position of the time domain resource as a first symbol satisfying a preset timing relationship, wherein said symbol is a symbol in a period of time for uplink transmission; or determine a start position of the time domain resource as a first symbol in a period of time for uplink transmission satisfying a preset timing relationship, wherein whether the timing relationship is satisfied is determined by symbol spacing between a last symbol for downlink data transmission, and the first symbol in the period of time for uplink transmission, wherein the timing relationship is a processing delay, wherein the processing delay comprises time for parsing and processing downlink data, and time for generating ACK/NACK feedback information corresponding to the downlink data, wherein with reference to an end of a transmission of downlink data, ACK/NACK feedback information thereof will be transmitted in an uplink symbol that is not earlier than an uplink symbol satisfying the processing delay; and
if a position of the time domain resource is predefined, and the uplink control information is periodic Channel State Information (CSI) feedback information, then the at least one processor is further configured to execute the computer readable program codes to:
determine a position of a start symbol of the time domain resource according to a preconfigured CSI feedback periodicity, wherein the periodicity is represented as Y1 symbols, and Y1 is a positive integer; or
determine a predetermined uplink symbol position in a sub-frame, in which CSI is transmitted, corresponding to a preconfigured CSI feedback periodicity as a position of a start symbol of the time domain resource, according to the CSI feedback periodicity, wherein the CSI feedback periodicity is represented as Y2 sub-frames, and Y2 is a positive integer.

16. The apparatus according to claim 10, wherein the at least one processor is further configured to execute the computer readable program codes to:
transmit the uplink control information over the determined resources without spreading; or
transmit the uplink control information over the determined resources with spreading.

17. The apparatus according to claim 16, wherein the at least one processor is further configured to execute the computer readable program codes to transmit the uplink control information over the determined resources without spreading by:
determining a quantity of code bits according to a quantity of REs, in which data are transmitted, over the determined resources, and a modulation and coding scheme, and performing channel coding and rate matching for the uplink control information based upon the quantity of code bits to obtain corresponding modulated symbols; and
mapping the modulated symbols obtained in a specific order onto the determined resources for transmission;
wherein the at least one processor is further configured to execute the computer readable program codes to transmit the uplink control information over the determined resources with spreading by:
determining a quantity of code bits according to a quantity of REs, in which data are transmitted, over the determined resources, a length of a spreading sequence and a modulation and coding scheme in use, and performing channel coding and rate matching for the uplink control information based upon the quantity of code bits to obtain corresponding modulated symbols; and
multiplying each of the modulated symbols obtained with an orthogonal sequence with a length of N to obtain spread modulated symbols with a length of N, and mapping the spread modulated symbols with the length of N onto an RE group in a symbol in the determined resources for transmission, wherein the RE group comprises N REs, and N is a length of the orthogonal sequence.

18. The apparatus according to claim 17, wherein when there are a plurality of symbols in the time domain resource and the uplink control information is transmitted over the determined resources with spreading, the at least one processor is further configured to execute the computer readable program codes to:
spread each symbol in a frequency domain using an orthogonal sequence with a length of N; or spread each symbol in a time domain using an orthogonal sequence with a length of B, wherein B is a quantity of symbols for transmitting data, among a quantity of symbols in the time domain resource, and both N and B are integers greater than or equal to 1; or spread each symbol in a frequency domain using an orthogonal sequence with a length of N, and spread each symbol in a time domain using an orthogonal sequence with a length of B, wherein B is a quantity of symbols for transmitting data, among a quantity of symbols in the time domain resource, and both N and B are integers greater than or equal to 1.

* * * * *